United States Patent
Farooqi

(10) Patent No.: US 10,133,558 B2
(45) Date of Patent: *Nov. 20, 2018

(54) APPLICATION CREATION SYSTEM

(71) Applicant: Arshad Farooqi, Ashburn, VA (US)

(72) Inventor: Arshad Farooqi, Ashburn, VA (US)

(73) Assignee: AFTECHMOBILE INC., Ashburn, VA (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/051,704

(22) Filed: Feb. 24, 2016

(65) Prior Publication Data
US 2016/0274875 A1 Sep. 22, 2016

Related U.S. Application Data

(63) Continuation of application No. 14/329,985, filed on Jul. 14, 2014, now abandoned, which is a continuation of application No. 13/946,325, filed on Jul. 19, 2013, now Pat. No. 8,813,028.

(60) Provisional application No. 61/673,702, filed on Jul. 19, 2012.

(51) Int. Cl.
G06F 8/36 (2018.01)
G06F 8/34 (2018.01)
G06F 9/445 (2018.01)

(52) U.S. Cl.
CPC . *G06F 8/36* (2013.01); *G06F 8/34* (2013.01)

(58) Field of Classification Search
CPC .................................. G06F 8/34; G06F 8/36
See application file for complete search history.

(56) References Cited

U.S. PATENT DOCUMENTS

| 8,239,840 | B1 * | 8/2012 | Czymontek | G06F 8/34 717/125 |
| 8,479,154 | B1 * | 7/2013 | Friedman | G06F 8/30 717/100 |
| 8,935,321 | B1 * | 1/2015 | Sankaranarayanan | G06F 8/36 707/802 |
| 2002/0056075 | A1 * | 5/2002 | Hamilton | G06F 8/34 717/110 |

(Continued)

*Primary Examiner* — Ziaul A Chowdhury
(74) *Attorney, Agent, or Firm* — Muncy, Geissler, Olds & Lowe, P.C.; Aaron J. Sanders

(57) ABSTRACT

A computer implemented method and system for creating a mobile application provides a mobile application development software (MADS) and pre-coded software components (PCSCs) encapsulated in a mobile application creation interface (MACI). The MADS dynamically maps data to be rendered in the mobile application with one or more data sources and launches the MACI. The MADS creates one or more composite software components (CSCs) by combining more than one of distinct software components selected from component sources and/or the PCSCs. The MADS inserts one or more PCSCs and/or CSCs into the MACI. The MADS generates one or more recommendations for adding one or more characteristic objects associated with the mobile application. The MADS creates the mobile application using the inserted PCSCs, the created composite software components, the recommendations, the dynamically mapped data, and/or an adaptively configured application programming interfaces that facilitate backend integration of the mobile application with the user device.

28 Claims, 19 Drawing Sheets

(56) References Cited

U.S. PATENT DOCUMENTS

| | | | | |
|---|---|---|---|---|
| 2003/0115378 A1* | 6/2003 | Zondervan | G06F 8/34 | 719/328 |
| 2003/0224770 A1* | 12/2003 | Reinholdsson | G06F 8/36 | 455/418 |
| 2004/0098733 A1* | 5/2004 | Bjare | G06F 8/34 | 719/328 |
| 2007/0011334 A1* | 1/2007 | Higgins | G06F 8/34 | 709/227 |
| 2007/0033584 A1* | 2/2007 | Yu | G06F 8/65 | 717/168 |
| 2007/0067373 A1* | 3/2007 | Higgins | G06F 11/3013 | |
| 2008/0195997 A1* | 8/2008 | Herberger | G06F 8/34 | 717/100 |
| 2010/0153515 A1* | 6/2010 | Lau | G06F 8/34 | 709/217 |
| 2011/0258345 A1* | 10/2011 | Bhanote | G06Q 30/02 | 709/248 |
| 2012/0096372 A1* | 4/2012 | Stolper | G06F 8/34 | 715/763 |
| 2012/0110546 A1* | 5/2012 | Jo | G06F 8/36 | 717/107 |
| 2012/0208564 A1* | 8/2012 | Clark | G06F 17/3087 | 455/456.3 |
| 2013/0254262 A1* | 9/2013 | Udall | H04L 67/42 | 709/203 |
| 2013/0262626 A1* | 10/2013 | Bozek | H04L 67/10 | 709/217 |
| 2014/0282371 A1* | 9/2014 | Hirsch | G06F 8/36 | 717/106 |
| 2015/0135160 A1* | 5/2015 | Gauvin | H04W 4/21 | 717/109 |
| 2017/0277519 A1* | 9/2017 | Lee | G06F 8/34 | |

* cited by examiner

APPLICATION CREATION SYSTEM

CROSS REFERENCE TO RELATED APPLICATIONS

This application is a continuation application of non-provisional patent application Ser. No. 14/329,985, titled "Mobile Application Creation System", filed on Jul. 14, 2014 in the United States Patent and Trademark Office, which is a continuation application of U.S. Pat. No. 8,813,028, titled "Mobile Application Creation System", filed on Jul. 19, 2013 in the United States Patent and Trademark Office, which claims the priority and benefit of provisional patent application No. 61/673,702 titled "Mobile Application Creation System", filed in the United States Patent and Trademark Office on Jul. 19, 2012.

The specifications of the above referenced patent applications are incorporated herein by reference in their entirety.

BACKGROUND

Consumers and business entities are increasingly using mobile devices such as smart phones, tablet computing devices, personal digital assistants, other handheld devices, etc., for performing various personal, work, and business or enterprise related tasks. In addition to using mobile devices for different forms of communication, for example, voice communication, messaging, etc., these mobile devices also allow consumers and business entities to perform other functions such as accessing and displaying websites, sending and receiving electronic mails, capturing and displaying images, playing videos, music and other forms of audio, social networking, etc. These functions are typically performed by software applications that are either built into the mobile devices or that are run on top of operating systems of the mobile devices.

Competing mobile device manufacturers, developers, and other service providers typically offer hardware and software in the form of mobile operating systems or in some cases, a combination of both hardware and software, which has led to the development of dissimilar and incompatible mobile device platforms and environments due to the use of different operating systems which have their own programming environments and software development tools. Developing mobile applications for these different operating systems and mobile devices requires varying design techniques, programming languages, separate operating system specific or device specific software code and compilations, etc. Therefore, developers find it difficult and challenging to develop mobile applications that are portable across multiple types of mobile devices. Furthermore, developers require specific technical knowledge and expertise in software programming with specific programming languages and an understanding of specific mobile operating system platforms for developing mobile applications for different types of mobile operating systems and/or mobile devices. Since a high level of skill and expertise is needed to create, deploy and update mobile applications, many non-technical users and users who lack experience in a specific programming language or a specific mobile operating system cannot develop and/or distribute mobile applications.

Conventional mobile development platforms typically allow users to develop mobile applications of a particular type that cannot be configured or changed and therefore limit the development and utilization of various features and specific functions included in mobile devices and their respective mobile operating systems. The scope of these mobile applications are limited to consumer applications such as access to website content, graphics, video, books, links to a social profile, etc. These mobile development platforms allow non-technical users to develop only generic business to consumer (B2C) applications with simplified rules. Business to consumer (B2C) type of mobile applications comprising metadata, for example, an application type are relatively easier to develop and are supported by most mobile development platforms. There is a need for providing pre-coded software components that are connected to backend databases to enable non-technical users to create mobile applications of different types without coding and by unifying similar or disparate software components from multiple data sources.

Moreover, conventional mobile development platforms only provide access to a single layer of data that allow, for example, web pages to be assembled on the fly but do not provide support for hierarchical layers of data, data interaction, and business rules that allow non-technical enterprise users to quickly assemble software components to develop enhanced enterprise grade mobile applications. Moreover, conventional mobile development platforms do not allow backend integration of the developed mobile application with the user's computing device or with backend databases for non-technical users.

Furthermore, context and behavioral elements, for example, user behavior, user intent, etc., varies from one user to another, and typical mobile application development platforms do not provide components or tools that are adaptable based on the context and behavioral elements. Moreover, conventional mobile application development platforms do not support dynamic data mapping for establishing a link between the data being rendered and multiple data sources prior to creation of a mobile application. Furthermore, non-technical users may not be aware of enhanced functions and features that can be implemented in a mobile application for enhancing the mobile application. There is a need for providing recommendations to a user for addition of enhanced functions and features in the mobile application based on a real time analysis of similar mobile applications developed, for example, based on functionality, an industry, and/or a category related to the mobile application.

Wearable devices, for example, the Google Glass® of Google Inc., iWatch of Apple Inc., etc., and associated technology are becoming more widespread and are being used in everyday life for carrying out various activities. Moreover, due to recent adoption of policies, for example, bring your own devices (BYOD), organizations are in constant need of mobile application development platforms that can be used by non-technical users to design and develop complex mobile applications that can be deployed across various devices including wearable devices with varying degrees of form factors, to securely manage upgrades and downloads through an application store, and to manage usage statistics to gain better visibility on mobile application usage. Typical mobile application development platforms do not allow non-technical users to develop and deploy complex business to business (B2B) mobile applications for these wearable devices.

Furthermore, machine to machine (M2M) applications use a device, for example, a sensor, a meter, etc., to capture an event, for example, temperature, an inventory level, etc., relay the captured event, for example, through a wireless, wired or hybrid network to a mobile application, and translate the captured event into meaningful information. The M2M applications allow both wireless and wired systems to communicate with other devices of the same ability. Typical mobile application development platforms do not combine device data, for example, sensor data with application business processes to enable decision making based on real time analytics and mashup applications.

Hence, there is a long felt but unresolved need for a computer implemented method and system that provides encapsulated pre-coded software components to perform multiple functions in the form of a software package and enterprise grade mobile applications that are connected with backend databases, enables creation of enhanced software components or widgets without coding, provides support for native, web and cross platform mobile applications, provides an interface to dynamically map backend data sources and add new fields on the fly, provides connection of data from multiple data sources, enables creation of complex business to business (B2B) mobile applications that require complex business rules and data validation, allows development of M2M applications or sensor specific applications that combine sensor data with business processes and creation of process and sensor composite or mashup applications, and implements application programming interfaces for backend integration of the developed mobile application with the user's computing device and with backend databases. Furthermore, there is a need for a computer implemented method and system that enables a user to create mobile applications with software components that comprise hierarchical layers of data and that adapt based on the context and behavioral elements of the user when deployed on mobile devices. Furthermore, there is a need for a computer implemented method and system that enables non-technical users to develop and deploy complex mobile applications for various devices including the wearable devices without any programming.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein address the above stated needs for providing encapsulated pre-coded software components to perform multiple functions in the form of a software package and enterprise grade mobile applications that are connected with backend databases, enabling creation of enhanced software components or widgets without coding, providing support for native, web and cross platform mobile applications, providing an interface to dynamically map backend data sources and add new fields on the fly, providing connection of data from multiple data sources, enabling creation of complex business to business (B2B) mobile applications that require complex business rules and data validation, allowing development of machine to machine (M2M) applications or sensor specific applications that combine sensor data with business processes and creation of process and sensor composite or mashup applications, and implementing application programming interfaces for backend integration of the developed mobile application with a user device and with backend databases. The computer implemented method and system disclosed herein also address the above stated needs for enabling a user to create mobile applications with software components that comprise hierarchical layers of data and that adapt based on the context and behavioral elements of the user, when deployed on mobile devices, and for allowing development and deployment of mobile applications for various devices including wearable devices, for example, Google Glass® of Google Inc., iWatch of Apple Inc., etc.

The computer implemented method and system disclosed herein provides a mobile application development software for creating a mobile application for a user device. The mobile application development software is executable by at least one processor configured to create the mobile application. The mobile application development software is configured as a platform that allows a user to access the platform using a thin client via a browser such as an internet browser and create complex mobile applications using tools and/or libraries hosted on a network such as the internet or hosted in a cloud computing environment. As used herein, the term "cloud computing environment" refers to a processing environment comprising configurable computing physical and logical resources, for example, networks, servers, storage, applications, services, etc., and data distributed over a network, for example, the internet. The mobile application development software is hosted on a mobile application development platform. The mobile application development software is accessible by a user device, for example, a personal computer, a tablet computing device, a mobile computer, a mobile phone, a smart phone, a portable computing device, a laptop, a personal digital assistant, a touch centric device, a workstation, a client device, a portable electronic device, a network enabled computing device, a gaming device, an interactive network enabled communication device, a wearable device such as Google Glass® of Google Inc., iWatch of Apple Inc., etc., any other suitable computing equipment, and combinations of multiple pieces of computing equipment, etc., via a network. In an embodiment, the mobile application development software is configured to operate, for example, as a software as a service (SaaS) or a platform as a service (PaaS).

The computer implemented method and system disclosed herein also provides multiple pre-coded software components executable by at least one processor and encapsulated in a mobile application creation interface. As used herein, the term "pre-coded software components" refers to pieces of pre-written computer program code encapsulated to perform predefined functions in the form of a software package or a software model. The pre-coded software components comprise, for example, smart widgets, micro widgets, etc. The pre-coded software components are adaptable based on mobile context and behavioral elements, for example, preferences of a user, habits of a user, etc. The pre-coded software components comprise hierarchical layers of data, interactive elements that enable interactions with the data, and predetermined criteria. As used herein, the term "interactive element" refers to any interface component configured to obtain data or feedback from a user, transform the obtained data into one or more visual entities, enable real time user interactions within the mobile application creation interface, etc. In an embodiment, the pre-coded software components further comprise social networking components that embed social features with business processes and/or follow up action items in the mobile application. Also, as used herein, the term "mobile application user interface" refers to a user interface simulator that allows the user to create the mobile application, in communication with the mobile application development software. In an embodiment, the pre-coded software components are configurable for generating supplementary software components, for example, smart widgets, micro widgets, etc., using the mobile application development software and multiple data sources.

The mobile application development software dynamically maps the data to be rendered in the mobile application with one or more data sources. In an embodiment, the mobile application development software dynamically populates the data sources in the mobile application creation interface and allows mapping of one or more of the data sources to one or more of the pre-coded software components for updating the pre-coded software components and/or for creating one or more distinct software components. The mobile application development software receives a selection of preconfigured user interfaces or a list of predefined user interfaces from the user device via the network for launching the mobile application creation interface. The user selects one or more of the pre-coded software components provided and displayed by the mobile application development software. The mobile application development software receives an indication of each of the selected pre-coded software components from the user device via the network. The mobile application development software creates one or more composite software components by combining more than one of distinct software components selected from multiple component sources and/or the pre-coded software components. As used herein, the term "composite software component" refers to a software component that uses and combines data, presentations, and/or functionalities from two or more component sources and functions as a new software component with a combination of data, presentations, and/or functionalities. The mobile application development software then inserts one or more of the selected pre-coded software components and the created composite software components into the launched mobile application creation interface.

The mobile application development software generates one or more recommendations for addition of one or more characteristic objects associated with the mobile application based on a real time analysis and dynamic learning of selective data of similar mobile applications developed, for example, based on functionality, an industry, a category, etc., related to the mobile application. As used herein, the term "characteristic objects" refer to additional features and functions characteristic to the functions, industries, and categories of other mobile applications that are similar to the mobile application being created, and that may be incorporated into the mobile application being created. In an embodiment, the mobile application development software dynamically updates the generated recommendations for the addition of one or more characteristic objects associated with the mobile application based on a selection of one or more supplementary characteristic objects received from the user device. The mobile application development software also adaptively configures one or more application programming interfaces (APIs) for a backend integration of the mobile application with the user device for operating the mobile application on the user device. The adaptively configured application programming interfaces implement, for example, one or more of a back office integration, a machine to machine convergence, a process to machine interaction, gamification, augmented reality, near field communication, etc., for establishing communication and exchange of the data between the created mobile application and the user device.

The mobile application development software creates the mobile application in the launched mobile application creation interface using one or more of the inserted pre-coded software components and the created composite software components, the generated recommendations, the dynamically mapped data, and the adaptively configured application programming interfaces. In an embodiment, the mobile application development platform generates revenue by distributing the created mobile application to enterprise application stores for a fee. In an embodiment, the mobile application development software displays real time data simulations of the mobile application in the launched mobile application creation interface during each stage of the creation of the mobile application. The mobile application development software connects the created mobile application to multiple backend databases via the network for creating enhanced mobile applications, for example, enterprise grade mobile applications. The mobile application development software enables creation of mobile applications of multiple types, for example, a native type of mobile application, a web type of mobile application, a cross platform type of mobile application, etc. In an embodiment, the mobile application development software provides direct access to web services and/or application programming interfaces (APIs) from a web address. In another embodiment, the mobile application development software collects real time usage data for tracking and categorizing users of the created mobile application and for providing real time analytics to target surveys, advertisements, etc., for example, to cross sell and/or up sell offerings, to provide offerings to retain mobile customers based on the mobile application usage and preferences, etc.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
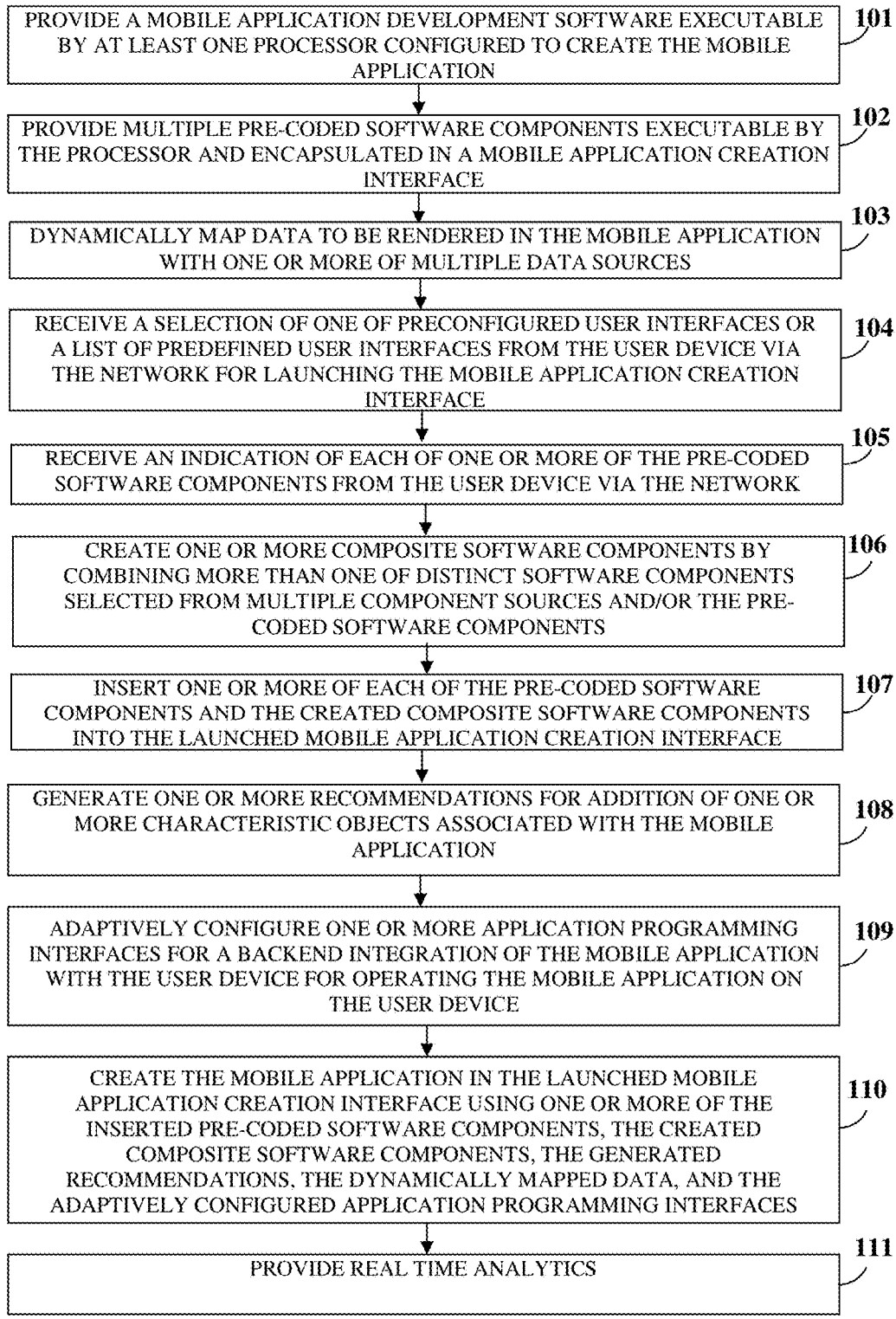
FIG. 1 illustrates a computer implemented method for creating a mobile application for a user device.

FIG. 1 illustrates a computer implemented method for creating a mobile application for a user device. The computer implemented method disclosed herein provides 101 a mobile application development software executable by at least one processor configured to create the mobile application. The mobile application development software is configured as a platform that allows a user to access the platform using a thin client via a browser such as an internet browser and create complex mobile applications using tools and/or libraries hosted on a network such as the internet or hosted in a cloud computing environment. As used herein, the term "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of configurable computing physical and logical resources. In an embodiment, the mobile application development software is configured to operate, for example, as a software as a service (SaaS) such as an enterprise based software service or as a platform as a service (PaaS) in a cloud computing environment. The computer implemented method disclosed herein therefore provides mobile application development as a service. The mobile application development software is accessible by a user device, for example, a personal computer, a tablet computing device, a mobile computer, a mobile phone, a smart phone, a portable computing device, a laptop, a personal digital assistant, a touch centric device, a workstation, a client device, a portable electronic device, a network enabled computing device, a gaming device, an interactive network enabled communication device, a wearable device such as Google Glass® of Google Inc., iWatch of Apple Inc., etc., any other suitable computing equipment, and combinations of multiple pieces of computing equipment, etc., via a network. The network is, for example, the internet, an intranet, a wired network, a wireless network, a network that implements Wi-Fi® of the Wireless Ethernet Compatibility Alliance, Inc., an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

The mobile application development software provides 102 multiple pre-coded software components, for example, smart widgets, micro widgets, etc., executable by at least one processor and encapsulated in a mobile application creation interface. As used herein, the term "pre-coded software components" refers to pieces of pre-written computer program code encapsulated to perform predefined functions in the form of a software package or a software model, for example, a smart widget, a micro widget, etc. Also, as used herein, the term "mobile application user interface" refers to a user interface simulator that allows the user to create the mobile application, in communication with the mobile application development software. The mobile application user interface is, for example, an online web interface accessible via a network such as the internet. The pre-coded software components may contain features that are adaptable based on context and behavioral elements, for example, preferences of a user, habits of a user, etc. The pre-coded software components such as smart widgets contain elements that are adaptable to the behavioral mindset of a mobile native user while the user accesses the smart widgets from the user device. For example, a sales management mobile application may highlight a list of accounts to follow up with based on contextual and behavioral elements such as a sales representative location and a contract review date.

The pre-coded software components further comprise hierarchical layers of data, for example, multiple layers of pages, interactive elements that enable interactions with the data, and predetermined criteria. As used herein, the term "interactive element" refers to any interface component configured to obtain data or feedback from a user, transform the obtained data into one or more visual entities, enable real time user interactions within the mobile application creation interface, etc. The predetermined criteria comprise, for example, a business rules. As an example, a business rule defines that a user can create new opportunities only for customers with existing accounts or customers. The mobile application development software provides, for example, a pre-coded opportunity widget that enables a user to search and select existing customers prior to creating a new opportunity record from their user device. If a customer does not exist in a database, the mobile application development software instructs the user to create a new user record prior to entering new opportunities. The mobile application development software represents the pre-coded software components as reusable graphical user interface elements on the mobile application creation interface. The pre-coded software components, for example, smart widgets are preassembled based on business process flow and requirements. The pre-coded software components comprise multiple layers of pages and/or user interfaces (UIs) and business rules. The pages and/or UIs are designed for mobile consumption unlike other application development platforms that provide only web pages to be assembled on the fly. For example, a marketing widget comprises relevant data fields shown on multiple layers of pages and business rules to allow a company to enforce certain business rules that each user has to follow while allowing each user to personalize the mobile application for their own consumption.

The pre-coded software components enable business process management, capture of documents, notes, etc., via a keyboard or another input device, via voice, etc., and social collaboration. In an embodiment, the pre-coded software components further comprise social networking components that embed social features with business processes in the mobile application. A user may insert social networking components, for example, a "like" button or a "follow" button in the mobile application to allow users to collaborate with other users who may share a common interest. Consider an example where a marketing team of an organization is working with a prospect and maintains an account for that prospect. From a social networking point of view, a user can "follow" and/or "like" the prospect's account through the mobile application and the team can add comments or collaborate with other users of the mobile application. The social networking components combine social sharing with business process management by embedding the social networking features within the business process of a pre-sales life cycle. In another embodiment, the pre-coded software components further comprise social networking components embedded with follow up action items. A user may insert a social networking component, for example, a "like" button along with a request to perform a follow up action item in the mobile application. For example, when a user clicks on the "like" button in the mobile application, the user is also required to take an action relevant to a social media item such as post a feedback note, buy a product, show an intent to buy a product, or any other type of follow up action item. In an embodiment, the pre-coded software components are configurable for generating supplementary software components, for example, smart widgets, micro widgets, etc., using the mobile application development software and multiple data sources.

The mobile application development software dynamically maps 103 the data to be rendered in the mobile application with one or more of multiple data sources. The data sources comprise other mobile applications and databases that are enabled for mobile consumption via application programming interfaces (APIs). For example, the mobile application development software maps the data to be rendered in the mobile application by linking the data, for example, with backend data sources, remote data sources, sensors, etc. In an embodiment, the mobile application development software dynamically populates the data sources in the mobile application creation interface and allows mapping of one or more of the data sources to one or more of the pre-coded software components for updating the pre-coded software components and/or for creating one or more distinct software components. The dynamic population of data sources in the mobile application creation interface allows a user to map one or more data sources to either an existing widget or create a new widget. In an embodiment, the dynamic mapping of data allows a user to generate a supplementary software component, for example, a widget that is connected to multiple data sources such as backend data sources, remote data sources, etc., and populate only those data fields in the mobile application that are mapped by the user. Consider an example where a data source has 10 data fields and there is a corresponding widget that shows all 10 data fields in the mobile application. If a company or a user wants to display only 5 data fields in the created mobile application, a user can map only those 5 data fields so that when a user drags and drops the widget on the mobile application creation interface or a simulator of the user device, only the mapped data fields, for example, 5 data fields are shown in the created mobile application. In an embodiment, the user is required to create data mappings and/or business rules before assembling the mobile application.

The mobile application development software receives 104 a selection of one of the preconfigured user interfaces also referred to as "custom" user interfaces, or one of a list of predefined user interfaces also referred to as "prebuilt" user interfaces, from the user device via the network for launching the mobile application creation interface. For example, the user may select a user interface designed by a user or a standard user interface provided by the mobile application development software for launching the mobile application creation interface. The user can then select one or more of the pre-coded software components provided and displayed by the mobile application development software. The mobile application development software enables non-technical enterprise users to quickly assemble smart widgets to develop enterprise grade mobile applications. The smart widget is preassembled based on business process flow and requirements. The mobile application development software allows users to drag and drop these preassembled widgets that comprise multiple layers of pages and business rules into the launched mobile application creation interface. The mobile application development software receives 105 an indication of each of the selected pre-coded software components from the user device via the network. For example, the mobile application development software receives a selection of pre-coded software components such as a smart widget, a micro widget, etc., from the user device.

The mobile application development software creates 106 one or more composite software components by combining more than one of distinct software components selected from multiple component or data sources and/or the pre-coded software components. As used herein, the term "composite software component" refers to a software component that uses and combines data, presentations, and/or functionalities from two or more component sources and functions as a new software component with a combination of data, presentations, and/or functionalities. For example, the mobile application development software creates composite software components such as mashups by combining more than one disparate pre-coded software component. In another example, the mobile application development software creates composite software components by combining more than one disparate software component from remote data sources, or by combining two or more disparate pre-coded software components and disparate software components from remote data sources. In another example, a user can assemble the mobile application by combining smart widgets connected to one or more component or data sources. The mobile application development software therefore enables creation of machine to machine (M2M) or sensor specific mobile applications and creation of process and sensor mashup applications. In an embodiment, the mobile application development software provides a drag and drop option associated with each of the pre-coded software components and the composite software components for allowing the user to virtually grab one or more of the pre-coded software components and the created composite software components and drag the pre-coded software components and the created composite software components into the launched mobile application creation interface. The mobile application development software enables the user to develop enterprise grade mobile applications using the drag and drop option. The mobile application development software inserts 107 one or more of the selected pre-coded software components and the created composite software components into the launched mobile application creation interface, as the user drags and drops the software components into the launched mobile application creation interface.

The mobile application development software generates 108 one or more recommendations for addition of one or more characteristic objects associated with the mobile application based on a real time analysis and dynamic learning of selective data of similar mobile applications developed, for example, based on functionality, an industry, and/or a category related to the mobile application. As used herein, the term "characteristic objects" refer to additional features and functions characteristic to the functions, industries, and categories of other mobile applications that are similar to the mobile application being created, and that may be incorporated into the mobile application being created. Consider an example where a user wishes to create an inventory management application based on the user's knowledge and business requirements. The user decides to include some basic features to enable an end user to perform certain functions. Based on the functionality, the industry, and the category of the inventory management application, a recommendation engine of the mobile application development software analyzes similar applications developed by other users and compares the characteristic objects included. If the comparison results show an additional characteristic object relevant to the inventory management application, the recommendation engine generates a recommendation to include that characteristic object in the inventory management application. While assembling the mobile application, the recommendation engine learns from other mobile applications being developed based on the type of mobile application and other characteristics and generates recommendations based on a real time analysis of the data. The user has the option of accepting or rejecting the generated recommendation.

Consider another example where a sales mobile application created by a user comprises multiple associated widgets. The widgets associated with the sales mobile application are, for example, accounts, contacts, leads, etc. The mobile application development software dynamically updates the associated widgets based on addition of other widgets for the same mobile application type. If another user while creating the same mobile application type, that is a sales type of mobile application, decides to add an opportunity widget and agrees to share the selection, the mobile application development software dynamically associates the opportunity widget with the sales application. This association grows as more and more users add additional widgets to develop a certain type of mobile application. In another example, the mobile application development software provides a real time recommendation of certain features to be added to the mobile application and also the type of mobile applications that should be developed at an enterprise level.

In an embodiment, the mobile application development software dynamically updates the generated recommendations for addition of the characteristic objects associated with the mobile application based on a selection of one or more supplementary characteristic objects received from the user device. For example, the mobile application development software dynamically updates the generated recommendations pertaining to a sales function, industry, or category, if a user selects addition of a characteristic object such as tracking a sales order. The mobile application development software leverages selective data to provide specific recommendations to end users while they use a mobile application created using the mobile application development software.

The mobile application development software adaptively configures 109 one or more application programming interfaces (APIs) for a backend integration of the mobile application with the user device for operating the mobile application on the user device. The mobile application development software enables standard backend integration via the application programming interfaces (APIs), which does not require additional programming. That is, the same API can connect to either a process based backend data/system or another sensor. The mobile application development software passes a parameter to indicate the type of connection between the mobile application and the user device and/or a data source. The mobile application development software configures the API to adjust the configuration based on the connection type thus minimizing efforts on further programming. The configuration of the API helps users to easily integrate machine to machine (M2M) or sensor specific data with business processes. Consider an example where a mobile application collects information on current readings from a patient's blood pressure monitoring system and retrieves data from another system that stores historical blood pressure readings of the patient including additional information such as drugs, readings of other vital signs, etc. In this instance, the mobile application development software uses the same API call with different parameters to retrieve sensor data, that is, the blood pressure data and process data. The mobile application development software displays the retrieved data to the user to enable better decision making.

The mobile application development software creates 110 the mobile application in the launched mobile application creation interface using one or more of the inserted pre-coded software components and the created composite software components, the generated recommendations, the dynamically mapped data, and/or the adaptively configured application programming interfaces. For example, the mobile application development software creates the mobile application using one or more widgets and/or page layouts that are predefined or dynamically created by users, the generated recommendations, fields that are dynamically mapped with the data sources and the new fields that are added to a widget using the drag and drop option, and the adaptively configured application programming interfaces. The adaptively configured application programming interfaces implement, for example, one or more of a back office integration, a machine to machine convergence, a process to machine interaction, gamification, augmented reality, and near field communication for establishing communication and exchange of data between the created mobile application and the user device as disclosed in the detailed description of FIG. 2. The mobile application development software creates mobile applications of multiple types, for example, a native type of mobile application developed specifically for a particular type of an operating system of a user device, a web type of mobile application developed based on web browser technology, and a cross platform type of mobile application developed to work on any operating system of a user device, for example, iOS® of Apple Inc., the Android operating system, Blackberry® operating system of Research in Motion Limited, Windows mobile of Microsoft Corporation, the operating system of Google Glass® of Google Inc., iWatch of Apple Inc., etc.

In an embodiment, the mobile application development software displays real time data simulations of the mobile application in the launched mobile application creation interface during each stage of creation of the mobile application. For example, the mobile application development software displays real time data during the dynamic mapping stage of the data to be rendered in the mobile application. In another example, the mobile application development software displays real time data during the creation stage of one or more composite software components. As the user drags and drops the software components into the launched mobile application creation interface, the mobile application development software displays real time data simulations of the mobile application with the selected composite software components. The mobile application development software uses the real time data of each stage of the process to display the real time data simulations of the mobile application in the launched mobile application creation interface.

In an embodiment, the mobile application development software connects the created mobile application to multiple backend databases via the network for creating enhanced mobile applications, for example, enterprise grade mobile applications. The connection of the created mobile application to backend databases enables a user to extend the backend processes for mobile consumption and deploy the created mobile application across different platforms without any coding or programming. The connection of the created mobile application to backend databases enables non-technical users to develop complicated business to business (B2B) type of mobile applications that require business rules and data validation. The business rules for creating (B2B) mobile applications are stored in the backend databases. In an embodiment, the mobile application development software also provides direct access to web services and/or application programming interfaces from a web address. The direct access to web services and/or application programming interfaces from the web address is achieved as long as the data on the web service is exposed for consumption. In an embodiment, the mobile application development software collects real time usage data for tracking and categorizing users of the created mobile applications and for providing 111 real time analytics of users of the created mobile applications to target surveys, advertisements, etc., for example, to cross sell and/or up sell offerings, to provide offerings to retain mobile customers based on the mobile application usage and preferences, etc. In an embodiment, the mobile application development software supports advanced analytics using an in-memory database. The in-memory database resides on a server hosting the mobile application development software or in a memory unit of the user device or on a random access memory (RAM). In this embodiment, instead of storing the data associated with the advanced analytics on a server database, the mobile application development software stores the data using a combination of the memory of the user device and the server in-memory databases to provide real time analytics.

In an embodiment, the mobile application development software provides multiple pre-coded software components that are configurable to operate with other mobile application development software or platforms, a mobile enterprise application platform (MEAP), a mobile consumer application platform (MCAP) as a bot-on solution, etc. For example, power users can develop mobile applications using the mobile application development software, but further enhancement and deployment can be seamlessly integrated with other mobile application development platforms.

Consider an example where a user wishes to create a mobile application using the mobile application development software. The user selects a pre-coded software component such as a widget containing multiple layers of pages, data interaction and business rules and a predefined page layout or dynamically creates a widget using the mobile application development software. The mobile application development software launches the mobile application creation interface. The user then dynamically maps data fields with data sources and adds new data fields that do not exist in the widget in the launched mobile application creation interface. Once the mapping is performed, the user can drag and drop widgets to assemble the mobile application within the launched mobile application creation interface. The mobile application development software renders real time data in the launched mobile application creation interface while creating the mobile application. The mobile application development software provides support for native, web, and cross platform mobile applications. Once the mobile applications are created or built and published, for example, on an enterprise application store, end users can download the mobile applications by accessing the enterprise application store directly from their user devices such as mobile phones.

In an embodiment, the mobile application development platform hosting the mobile application development software generates revenue by distributing the created mobile applications, for example, to an enterprise application store for a fee. In another embodiment, end users can further create or personalize functions of the mobile application and workflow according to their personal preferences. For example, while one user can create a mobile application that displays a "to do" list on his/her home screen and "leads" near his/her location, another user can create a mobile application that displays "to do" lists, events, and new opportunities. These features can be customized while using a mobile application on the user device. In another embodiment, business users can collaboratively create a mobile application with other users using the mobile application development software. For example, users can seek inputs from other online business users using the mobile application development software via the network to provide input into mobile application design and features, and to add additional characteristic objects into the mobile application. In another embodiment, a business user after designing a mobile application can send the mobile application design for approval to his/her manager, for example, via a workflow process or an electronic mail. Once the manager approves the mobile application design, the mobile application development software transmits the approved mobile application for publishing on the enterprise application store.

Figure 2:
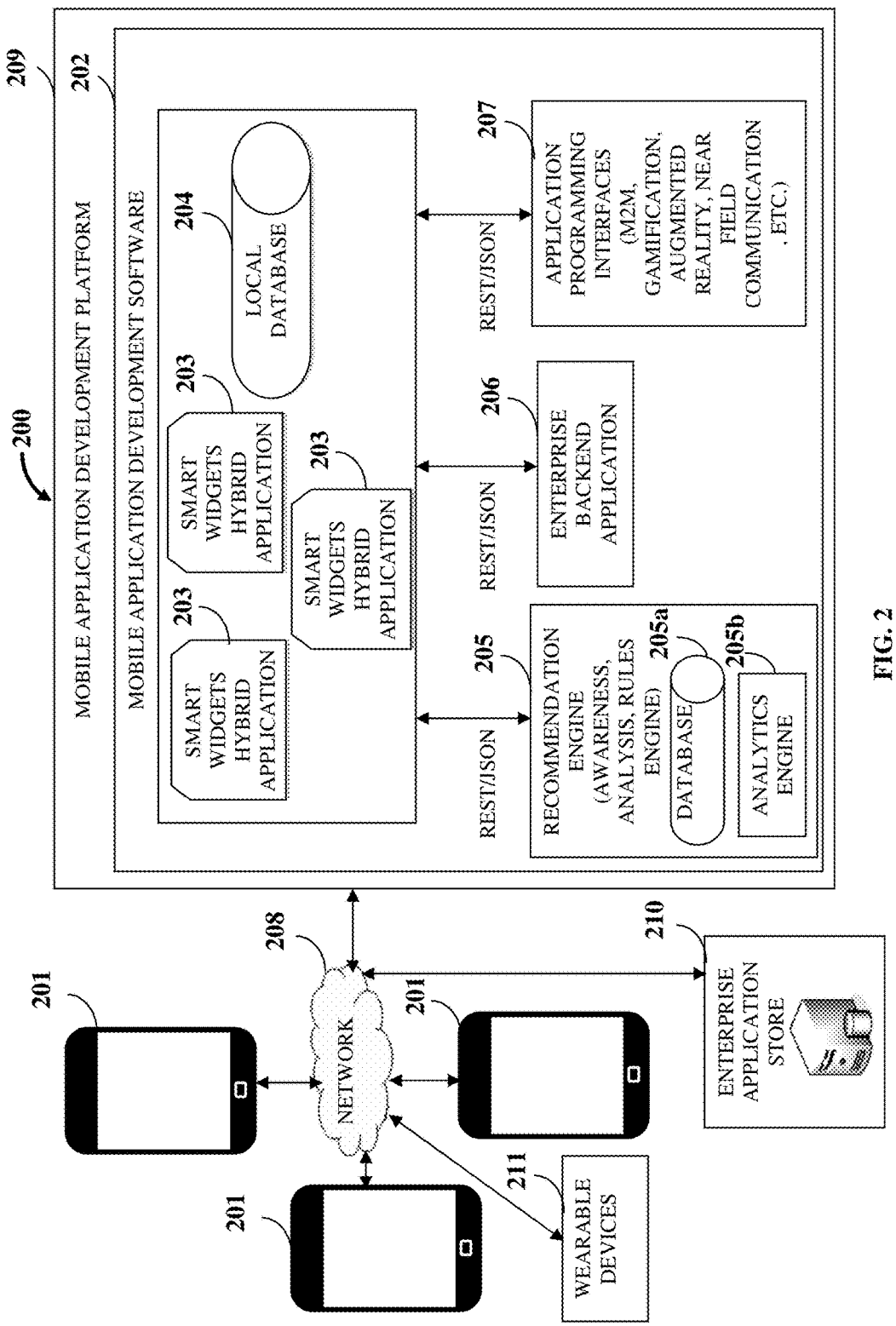
FIG. 2 exemplarily illustrates a high level architecture of a computer implemented system for creating a mobile application for a user device.

FIG. 2 exemplarily illustrates a high level architecture diagram of a computer implemented system 200 for creating a mobile application for a user device 201. The computer implemented system 200 disclosed herein comprises the mobile application development software 202 accessible by multiple user devices 201, for example, personal computers, tablet computing devices, mobile computers, mobile phones, smart phones, etc., via a network 208, for example, the internet, a mobile communication network, etc. The mobile application development software 202 is also accessible by wearable devices 211, for example, Google Glass® of Google Inc., iWatch of Apple Inc., etc. In an embodiment, the mobile application development software 202 is hosted on a mobile application development platform 209 accessible by multiple user devices 201 via the network 208. The mobile application development software 202 hosts multiple pre-coded software components, for example, smart widgets hybrid applications 203 also referred to as "smart widgets", executable by at least one processor and insertable into the launched mobile application creation interface. The smart widgets 203 are adaptable based on context and behavioral elements as disclosed in the detailed description of FIG. 1. The smart widgets 203 are representations of a set of pre-written codes that perform predefined functions, for example, sales functions. The smart widgets 203 are, for example, programs coded in JavaScript®, that are prepackaged with client JavaScript® libraries by using advanced features of model view controller (MVC) design patterns. A model view controller is a computer user interface that separates a representation of information from the user's interaction with the information. The mobile application development software 202 implements reactive programming for adapting the smart widgets 203 and application programming interfaces (APIs) 207.

The mobile application development software 202 further comprises a recommendation engine 205, an enterprise backend application 206, application programming interfaces 207, and a local database 204. The local database 204 stores the smart widgets 203 and their metadata for the mobile application being created by power users. The mobile application development software 202 invokes the recommendation engine 205, the enterprise backend application 206, and the application programming interfaces 207, for example, via a JavaScript Object Notation (JSON) based representational state transfer (REST) architecture. The recommendation engine 205 generates one or more recommendations for addition of one or more characteristic objects associated with the mobile application based on a real time analysis and dynamic learning of selective data of similar mobile applications developed, for example, based on functionality, an industry, and/or a category related to the mobile application. The recommendation engine 205 comprises an analytics engine 205b that performs the real time analysis for addition of one or more characteristic objects associated with the mobile application. The mobile application development software 202 provides support for real time analysis and dynamic learning of selective data of similar mobile applications using in-memory databases, for example, 205a. The recommendation engine 205 further comprises a database 205a to store the generated recommendations. The enterprise backend application 206 adaptively configures the application programming interfaces 207 for a backend integration of the mobile application with the user device 201 for launching the mobile application on the user device 201. The mobile application development software 202 implements application programming interfaces 207 used for machine to machine (M2M) convergence, gamification, augmented reality, near field communication, etc., for backend integration of the mobile application with the user device 201. The mobile application development software 202 utilizes game design techniques, game thinking, and game mechanics to enhance non-game contexts in mobile application development. Augmented reality (AR) is a live, direct or indirect, view of a physical, real world environment whose elements are augmented by computer-generated sensory input such as sound, video, graphics, etc. The mobile application development software 202 transmits the created mobile applications for publishing and distribution, for example, to an enterprise application store 210. End users can download the created mobile applications by accessing the enterprise application store 210 directly from their user devices 201.

Figure 3:
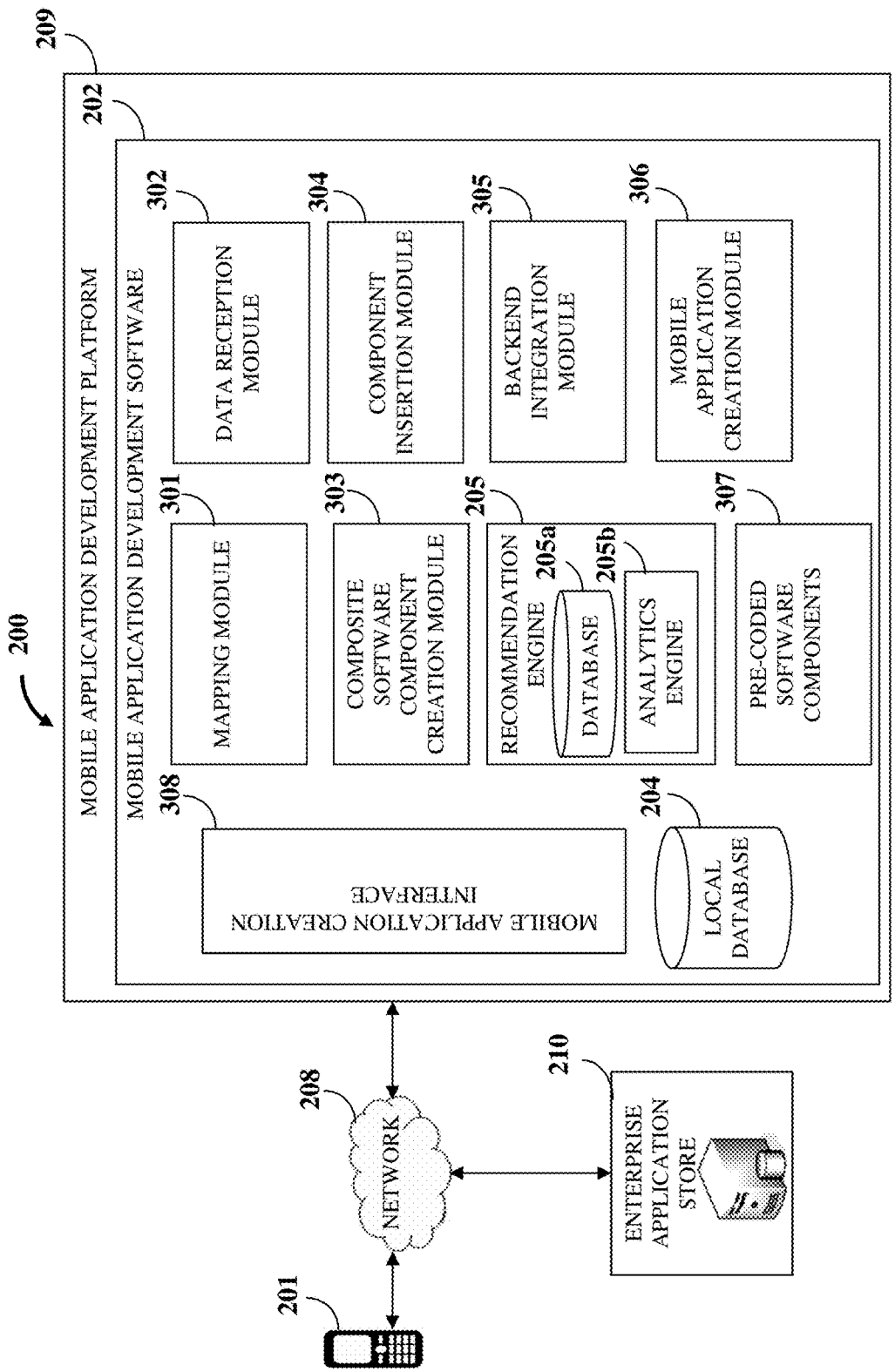
FIG. 3 exemplarily illustrates a computer implemented system for creating a mobile application for a user device, showing different modules of a mobile application development software.

FIG. 3 exemplarily illustrates a computer implemented system 200 for creating a mobile application for a user device 201, showing different modules, for example, 205, 205b, 301, 302, 303, 304, 305, 306, and 307 of the mobile application development software 202. The mobile application development software 202 is hosted, for example, on a mobile application development platform 209. The computer implemented system 200 disclosed herein comprises at least one processor, a non-transitory computer readable storage medium communicatively coupled to the processor, and the mobile application development software 202 executable by the processor. The mobile application development software 202 is accessible by a user device 201, for example, a mobile phone, a laptop, a tablet computing device, a wearable device 211 such as Google Glass® of Google Inc., iWatch of Apple Inc., etc., exemplarily illustrated in FIG. 2, via a network 208, for example, the internet, a mobile communication network, etc. The non-transitory computer readable storage medium is configured, for example, in the form of a database, for example, 204 to store the modules, for example, 301, 302, 303, 304, 305, 306, 307, etc., of the mobile application development software 202.

The mobile application development software 202 comprises pre-coded software components 307, a mapping module 301, a data reception module 302, a composite software component creation module 303, a component insertion module 304, a recommendation engine 205, a backend integration module 305, a mobile application creation module 306, and an analytics engine 205b. In an embodiment, the analytics engine 205b is incorporated in the recommendation engine 205. The mobile application development software 202 further comprises a mobile application creation interface 308 and a local database 204. The local database 204 stores the pre-coded software components 307. The pre-coded software components 307 as disclosed in the detailed description of FIG. 1 are encapsulated in the mobile application creation interface 308 and are adaptable based on context and behavioral elements. The mapping module 301 dynamically maps the data to be rendered in the mobile application with one or more data sources. In an embodiment, the mapping module 301 dynamically populates the data sources in the mobile application creation interface 308 and maps one or more of the data sources to one or more of the pre-coded software components 307 for updating the pre-coded software components 307 and/or for creating one or more distinct software components based on inputs received from the user device 201. The data reception module 302 receives a selection of one of the preconfigured user interfaces or one of the predefined user interfaces from the user device 201 via the network 208 for launching the mobile application creation interface 308. The data reception module 302 further receives an indication of each of one or more of the pre-coded software components 307 selected by a user via the network 208.

The composite software component creation module 303 creates one or more composite software components by combining more than one of distinct software components selected from multiple component sources and/or the pre-coded software components 307. The component insertion module 304 inserts the selected pre-coded software components 307 and the created composite software components into the launched mobile application creation interface 308. The recommendation engine 205 generates one or more recommendations for addition of one or more characteristic objects associated with the mobile application based on a real time analysis and dynamic learning of selective data of similar mobile applications developed, for example, based on functionality, an industry, and/or a category related to the mobile application. The recommendation engine 205 comprises a database 205a for storing the generated recommendations. The recommendation engine 205 further dynamically updates the generated recommendations for addition of the characteristic objects associated with the mobile application based on a selection of one or more supplementary characteristic objects received from the user device 201. The backend integration module 305 adaptively configures one or more application programming interfaces 207 for a backend integration of the mobile application with the user device 201 for operating the mobile application on the user device 201. The backend integration module 305 further connects the created mobile application to multiple backend databases via the network 208 for creating enhanced mobile applications.

The mobile application creation module 306 creates the mobile application in the launched mobile application creation interface 308 using one or more of the inserted pre-coded software components 307 and the created composite software components, the generated recommendations, the dynamically mapped data, and the adaptively configured application programming interfaces 207. The mobile application creation module 306 further displays real time data simulations of the mobile application in the launched mobile application creation interface 308 during each stage of creation of the mobile application. In an embodiment, the mobile application creation module 306 transmits the created mobile application to another user specified by the user who created the mobile application for approval. On receiving approval, the mobile application creation module 306 transmits the approved mobile application to an enterprise application store 210 for publishing on the enterprise application store 210. The analytics engine 205b collects real time usage data for tracking and categorizing users of the created mobile application and for providing real time analytics, for example, to target surveys, advertisements, etc.

Figure 4:
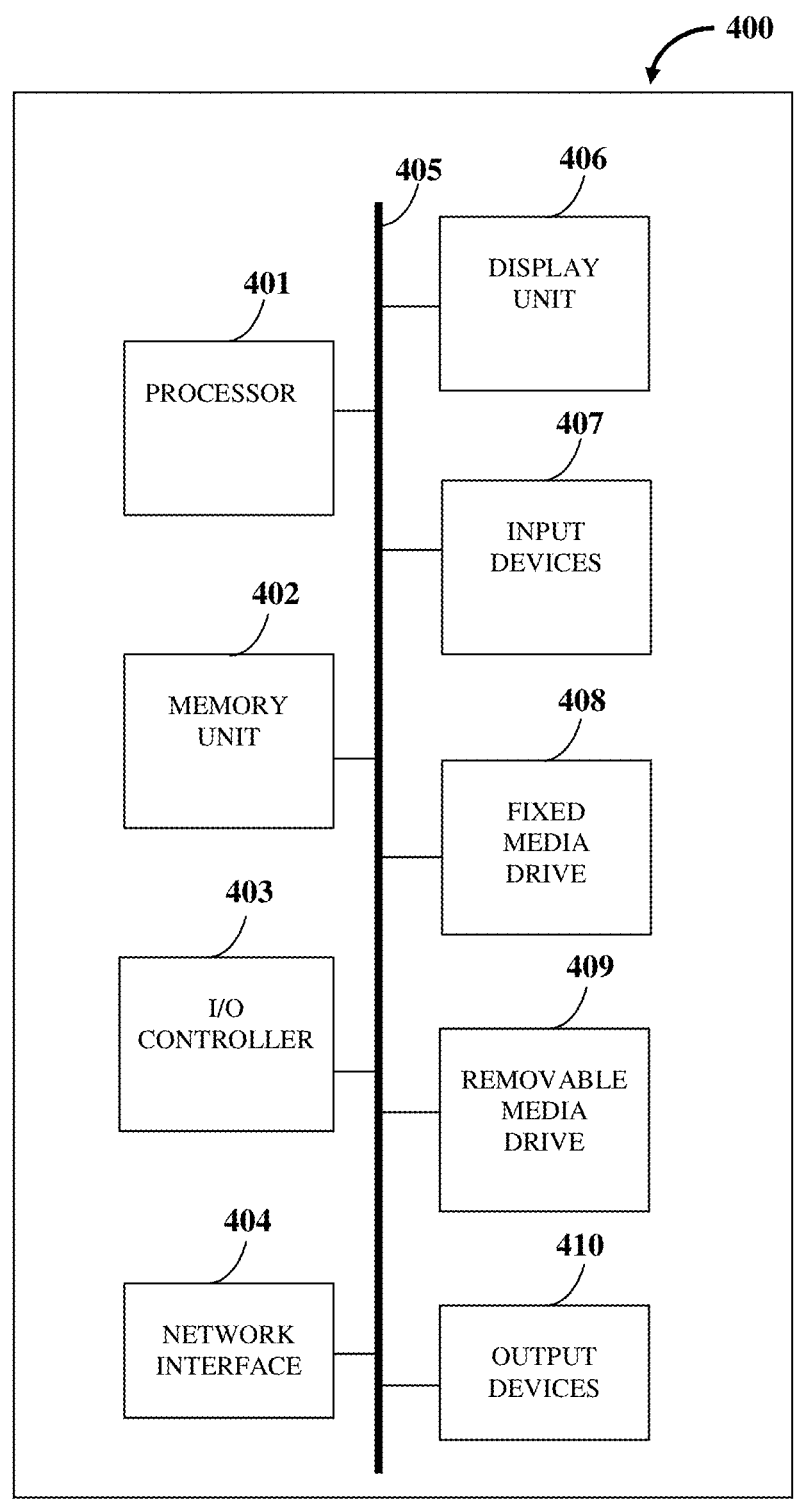
FIG. 4 exemplarily illustrates the architecture of a computer system employed by the mobile application development software for creating a mobile application for a user device.

FIG. 4 exemplarily illustrates the architecture of a computer system 400 employed by the mobile application development software 202 for creating a mobile application for a user device 201. The mobile application development software 202 of the computer implemented system 200 exemplarily illustrated in FIGS. 2-3 employs the architecture of the computer system 400 exemplarily illustrated in FIG. 4. The computer system 400 is programmable using a high level computer programming language. The computer system 400 may be implemented using programmed and purposeful hardware.

The computer system 400 comprises, for example, a processor 401, a memory unit 402 for storing programs and data, an input/output (I/O) controller 403, a network interface 404, a data bus 405, a display unit 406, input devices 407, a fixed media drive 408, a removable media drive 409 for receiving removable media, output devices 410, etc. The term "processor" refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 401 may also be implemented as a processor set comprising, for example, a general purpose microprocessor and a math or graphics co-processor. The processor 401 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The computer implemented system 200 disclosed herein is not limited to the computer system 400 employing the processor 401. The computer system 400 may also employ a controller or a microcontroller.

The memory unit 402 is used for storing programs, applications, and data. For example, the mapping module 301, the data reception module 302, the composite software component creation module 303, the component insertion module 304, the recommendation engine 205, the backend integration module 305, the mobile application creation module 306, the pre-coded software components 307, and the analytics engine 205b, etc., of the mobile application development software 202 are stored in the memory unit 402 of the computer system 400 of the mobile application development software 202. The memory unit 402 is, for example, a random access memory (RAM) or another type of dynamic storage device that stores information and instructions for execution by the processor 401. The memory unit 402 also stores temporary variables and other intermediate information used during execution of the instructions by the processor 401. The computer system 400 further comprises a read only memory (ROM) or another type of static storage device that stores static information and instructions for the processor 401.

The I/O controller 403 controls input actions and output actions performed by the mobile application development software 202. The network interface 404 enables connection of the computer system 400 to the network 208. For example, the computer system 400 employed by the mobile application development software 202 connects to the network 208 via the network interface 404. In an embodiment, the network interface 404 is provided as an interface card also referred to as a line card. The network interface 404 comprises, for example, one or more of an infrared (IR) interface, an interface implementing Wi-Fi® of the Wireless Ethernet Compatibility Alliance, Inc., a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high-speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 405 permits communications between the modules, for example, 301, 302, 303, 304, 305, 306, 307, 205, 205b, etc., of the mobile application development software 202.

The display unit 406 displays information, display interfaces, user interface elements such as data fields, text boxes, windows, icons representing the pre-coded software components 307, etc. The display unit 406 comprises, for example, a liquid crystal display, a plasma display, an organic light emitting diode (OLED) based display, etc. The input devices 407 are used for inputting data into the computer system 400. For example, a user may enter a selection of one of the preconfigured user interfaces or the predefined user interfaces using the input devices 407. The input devices 407 are, for example, a keyboard such as an alphanumeric keyboard, a microphone, a joystick, a pointing device such as a computer mouse, a touch pad, a light pen, a physical button, a pointing device, a touch sensitive display device, a track ball, a pointing stick, any device capable of sensing a tactile input, etc.

Computer applications and programs are used for operating the computer system 400. The programs are loaded onto the fixed media drive 408 and into the memory unit 402 of the computer system 400 via the removable media drive 409. In an embodiment, the computer applications and programs may be loaded directly via the network 208. Computer applications and programs are executed by double clicking a related icon displayed on the display unit 406 using one of the input devices 407. The output devices 410 output the results of operations performed by the mobile application development software 202. For example, the mobile application development software 202 displays real time data simulations of the mobile application in the launched mobile application creation interface 308 during each stage of creation of the mobile application using the output devices 410.

The processor 401 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., Palm OS®, the Solaris operating system developed by Sun Microsystems, Inc., the Android operating system, Windows Phone™ operating system of Microsoft Corporation, BlackBerry® operating system of Research in Motion Limited, the iOS® operating system of Apple Inc., the Symbian® operating system of Symbian Foundation Limited, an operating system of a wearable device 211, etc. The computer system 400 employs the operating system for performing multiple tasks. The operating system is responsible for management of and coordination of activities and sharing of resources of the computer system 400. The operating system further manages security of the computer system 400, peripheral devices connected to the computer system 400, and network connections. The operating system employed on the computer system 400 recognizes, for example, inputs provided by the users using one of the input devices 407, the output display, files, and directories stored locally on the fixed media drive 408, for example, a hard drive. The operating system on the computer system 400 executes different programs using the processor 401. The processor 401 and the operating system together define a computer platform for which application programs in high level programming languages are written.

The processor 401 retrieves instructions for executing the modules, for example, 301, 302, 303, 304, 305, 306, 307, 205, 205b, etc., of the mobile application development software 202 from the memory unit 402. A program counter determines the location of the instructions in the memory unit 402. The program counter stores a number that identifies the current position in the program of each of the modules, for example, 301, 302, 303, 304, 305, 306, 307, 205, 205b, etc., of the mobile application development software 202. The instructions fetched by the processor 401 from the memory unit 402 after being processed are decoded. The instructions are stored in an instruction register in the processor 401. After processing and decoding, the processor 401 executes the instructions. For example, the mapping module 301 defines instructions for dynamically mapping the data to be rendered in the mobile application with one or more data sources. The mapping module 301 also defines instructions for dynamically populating the data sources in the mobile application creation interface 308 and mapping one or more of the data sources to one or more of the pre-coded software components 307 for updating the pre-coded software components 307 and/or creating distinct software components based on inputs received from the user device 201. The data reception module 302 defines instructions for receiving a selection of one of the preconfigured user interfaces or the predefined user interfaces from the user device 201 via the network 208 for launching the mobile application creation interface 308. Furthermore, the data reception module 302 defines instructions for receiving an indication of each of the selected pre-coded software components 307 from the user device 201 via the network 208. The composite software component creation module 303 defines instructions for creating one or more composite software components by combining more than one of distinct software components selected from multiple component sources and/or the pre-coded software components 307.

The component insertion module 304 defines instructions for inserting one or more of the selected pre-coded software components 307 and the created composite software components into the launched mobile application creation interface 308. The recommendation engine 205 defines instructions for generating one or more recommendations for addition of one or more characteristic objects associated with the mobile application based on a real time analysis and dynamic learning of selective data of similar mobile applications developed, for example, based on functionality, an industry, and/or a category related to the mobile application. Furthermore, the recommendation engine 205 defines instructions for dynamically updating the generated recommendations for addition of the characteristic objects associated with the mobile application based on a selection of one or more supplementary characteristic objects received from the user device 201.

The backend integration module 305 defines instructions for adaptively configuring one or more application programming interfaces 207 for a backend integration of the mobile application with the user device 201 for launching the mobile application on the user device 201. The mobile application creation module 306 defines instructions for creating the mobile application in the launched mobile application creation interface 308 using one or more of the inserted pre-coded software components 307 and the created composite software components, the generated recommendations, the dynamically mapped data, and the adaptively configured application programming interfaces 207. Furthermore, the mobile application creation module 306 defines instructions for displaying real time data simulations of the mobile application in the launched mobile application creation interface 308 during each stage of creation of the mobile application. The backend integration module 305 defines instructions for connecting the created mobile application to multiple backend databases via the network 208 for creating enhanced mobile applications. The analytics engine 205b defines instructions for collecting real time usage data for tracking and categorizing users of the created mobile application and providing real time analytics, for example, to target surveys, advertisements, etc.

The processor 401 of the computer system 400 employed by the mobile application development software 202 retrieves the instructions defined by the mapping module 301, the data reception module 302, the composite software component creation module 303, the component insertion module 304, the recommendation engine 205, the backend integration module 305, the mobile application creation module 306, the analytics engine 205b, etc., of the mobile application development software 202, and executes the instructions, thereby performing one or more processes defined by those instructions.

At the time of execution, the instructions stored in the instruction register are examined to determine the operations to be performed. The processor 401 then performs the specified operations. The operations comprise arithmetic operations and logic operations. The operating system performs multiple routines for performing a number of tasks required to assign the input devices 407, the output devices 410, and memory for execution of the modules, for example, 301, 302, 303, 304, 305, 306, 307, 309, 205, 205b, etc., of the mobile application development software 202. The tasks performed by the operating system comprise, for example, assigning memory to the modules, for example, 301, 302, 303, 304, 305, 306, 307, 309, 205, 205b, etc., of the mobile application development software 202, and to data used by the mobile application development software 202, moving data between the memory unit 402 and disk units, and handling input/output operations. The operating system performs the tasks on request by the operations and after performing the tasks, the operating system transfers the execution control back to the processor 401. The processor 401 continues the execution to obtain one or more outputs. The outputs of the execution of the modules, for example, 301, 302, 303, 304, 305, 306, 307, 309, 205, 205b, etc., of the mobile application development software 202 are displayed to the user on the display unit 406.

For purposes of illustration, the detailed description refers to the mobile application development software 202 being run locally on the computer system 400; however the scope of the computer implemented method and system 200 disclosed herein is not limited to the mobile application development software 202 being run locally on the computer system 400 via the operating system and the processor 401, but may be extended to run remotely over the network 208 by employing a web browser and a remote server, a mobile phone, or other electronic devices. One or more portions of the computer system 400 may be distributed across one or more computer systems (not shown) coupled to the network 208.

Disclosed herein is also a computer program product comprising a non-transitory computer readable storage medium that stores computer program codes comprising instructions executable by at least one processor 401 for creating a mobile application for a user device 201. As used herein, the term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 401, except for a transitory, propagating signal.

The computer program product comprise a first computer program code for dynamically mapping data to be rendered in the mobile application with one or more data sources; a second computer program code for receiving a selection of one of the preconfigured user interfaces or the predefined user interfaces from the user device 201 via the network 208 for launching the mobile application creation interface 308; a third computer program code for receiving an indication of each of the selected pre-coded software components 307 from the user device 201 via the network 208; a fourth computer program code for creating one or more composite software components by combining more than one of distinct software components selected from multiple component sources and the pre-coded software components 307; a fifth computer program code for inserting one or more of the pre-coded software components 307 and the created composite software components into the launched mobile application creation interface 308; a sixth computer program code for generating one or more recommendations for addition of one or more characteristic objects associated with the mobile application based on a real time analysis and dynamic learning of selective data of similar mobile applications developed, for example, based on functionality, an industry, and/or a category related to the mobile application; a seventh computer program code for adaptively configuring one or more application programming interfaces 207 for a backend integration of the mobile application with the user device 201 for operating the mobile application on the user device 201; and an eighth computer program code for creating the mobile application in the launched mobile application creation interface 308 using one or more of the inserted pre-coded software components 307 and the created composite software components, the generated recommendations, the dynamically mapped data, and the adaptively configured application programming interfaces 207. The computer program product disclosed herein further comprises one or more additional computer program codes for performing additional steps that may be required and contemplated for creating the mobile application for the user device 201. In an embodiment, a single piece of computer program code comprising computer executable instructions performs one or more steps of the computer implemented method disclosed herein for creating the mobile application for the user device 201.

The computer program codes comprising computer executable instructions are embodied on the non-transitory computer readable storage medium. The processor 401 of the computer system 400 retrieves these computer executable instructions and executes them. When the computer executable instructions are executed by the processor 401, the computer executable instructions cause the processor 401 to perform the steps of the computer implemented method for creating the mobile application for the user device 201.

Figure 5:
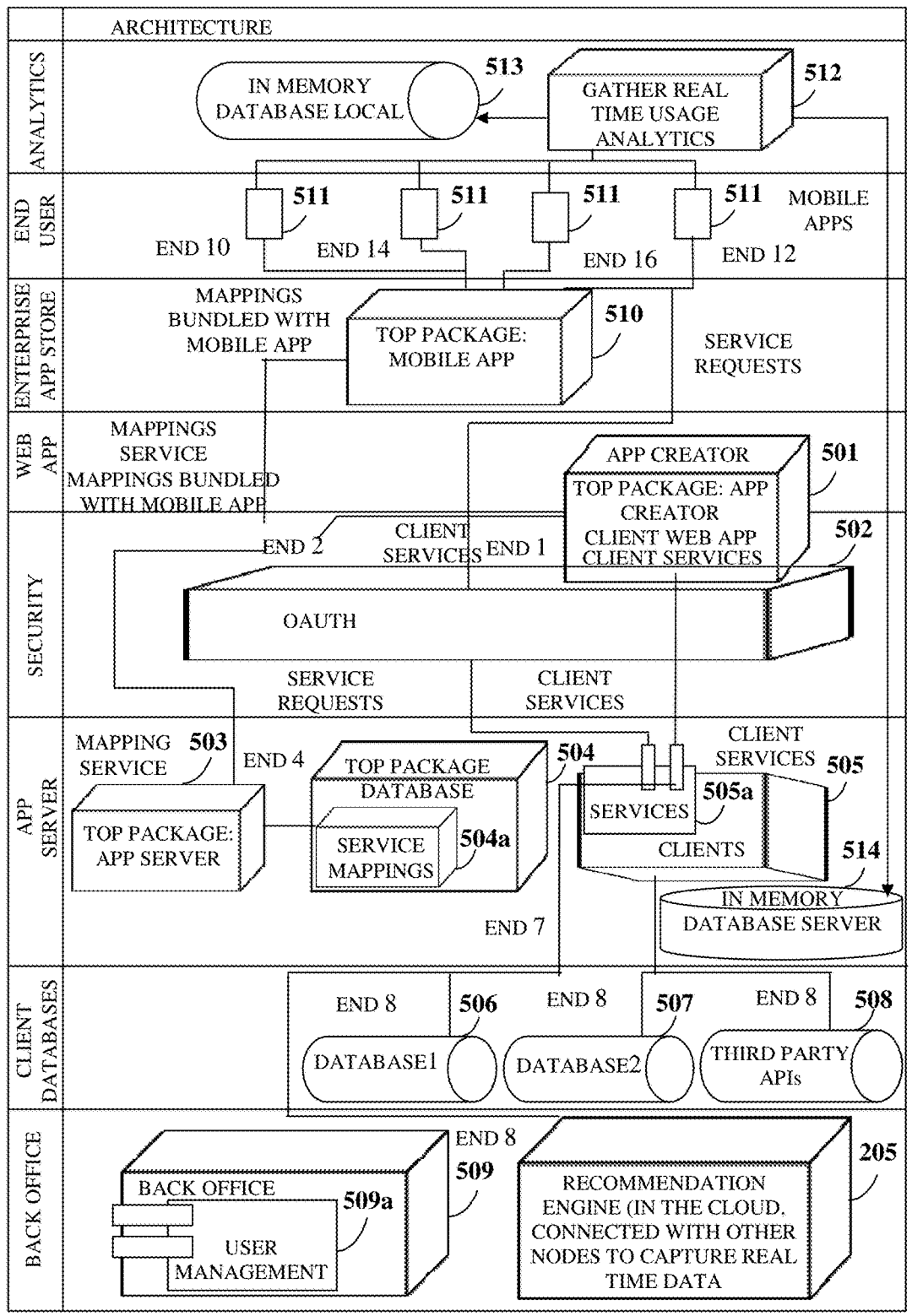
FIG. 5 exemplarily illustrates a low level architecture of the computer implemented system for creating a mobile application for a user device.

FIG. 5 exemplarily illustrates a low level architecture of the computer implemented system 200 exemplarily illustrated in FIGS. 2-3, for creating a mobile application 511 for a user device 201. The low level architecture of the computer implemented system 200 outlines interactions between different components of the mobile application development software 202. The low level architecture comprises a back office component 509, client databases 506, 507, etc., an application server, a security component, a web application component, an enterprise application store 210, and the analytics engine 205b exemplarily illustrated in FIGS. 2-3. The mobile application development software 202 creates a mobile application 511 for a user device 201 as disclosed in the detailed description of FIG. 1. The recommendation engine 205 that generates one or more recommendations for addition of one or more characteristic objects associated with the mobile application 511 based on a real time analysis and dynamic learning of selective data of similar mobile applications resides in the back office component 509. The recommendation engine 205 is implemented, for example, in a cloud computing environment and is connected to other resources or nodes in the computer implemented system 200 to capture real time data. The mobile application development software 202 supports advanced analytics using the analytics engine 205b that gathers 512 and stores real time usage data, for example, an in-memory database 513. The in-memory database 513 resides in the application server or in the memory of the user device memory or on the random access memory (RAM). The mobile application development software 202 stores the real time usage data using a combination of the memory of the user device 201 and the server in-memory databases 514.

The backend integration module 305 in the back office component 509, in addition to adaptively configuring application programming interfaces 207 for a backend integration of the mobile application 511 with the user device 201, also performs user management 509a. The back office component 509 stores user information, for example, user behavior for performing user management 509a. The mobile application development software 202 communicates with the client databases 506 and 507 and third party application programming interfaces (APIs) 508 for storing the created mobile applications 511, the generated recommendations, etc. The application server handles the operations between the user device 201, the back office component 509 and the client databases 506, 507, etc. For example, the mobile application development software 202 in communication with the application server handles compilation of mobile applications 511 based on user selections, connection of the created mobile applications 511 to backend databases, etc. The application server also communicates with the enterprise application (app) store 210 exemplarily illustrated in FIGS. 2-3. The application server provides bundled distribution service packages in the form of top packages 503 that are stored in a top package database 504.

The client services provided by the application server and the security component are mapped and stored in the top package database 504. The client service mappings 504a are then bundled with the created mobile application 511. The security services 502 allow secure authorization via an open standard for authorization (OAUTH) protocol for access of services 505a provided by the clients 505. A client web application 501 is created using client side web technologies and the client services are mapped and bundled with the mobile application 511 in the form of top packages 510. The created mobile applications 511 are distributed to end users via an online marketplace, for example, the enterprise application store 210.

Figure 6A:
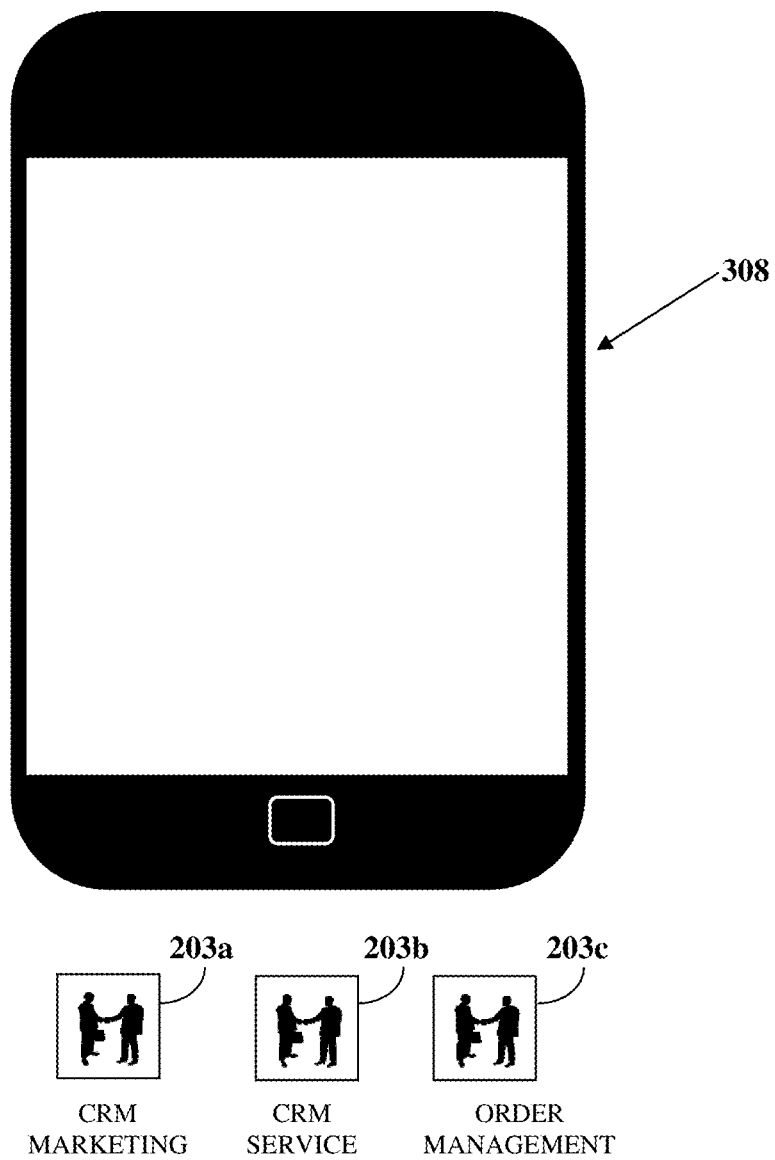
FIGS. 6A-6E exemplarily illustrate screenshots showing software components encapsulated in a mobile application creation interface.

FIGS. 6A-6E exemplarily illustrate screenshots showing software components encapsulated in a mobile application creation interface 308. The software components comprise the pre-coded software components 307 and/or the composite software components as disclosed in the detailed description of FIG. 1. FIG. 6A exemplarily illustrates software components, for example, smart widgets 203a, 203b, and 203c, micro widgets, etc., that are ready to be inserted into the mobile application creation interface 308. The mobile application development software 202, exemplarily illustrated in FIGS. 2-3, provides a sample list of software components, for example, smart widgets 203a, 203b, and 203c, micro widgets, etc., that can be used by the user for the creation of the mobile application such as a mobile web application, a hybrid application, etc. For example, the mobile application development software 202 provides a sample list of customer relationship management (CRM) smart widgets such as CRM marketing 203a, CRM service 203b, order management 203c, etc., to the user as exemplarily illustrated in FIG. 6A. The software components are inserted into the mobile application creation interface 308, for example, on a phone emulator, a tablet emulator, etc., by the user using the drag and drop option provided by the mobile application development software 202. In an embodiment, users can drag and drop industry specific widgets, for example, 203a, 203b, and 203c to make functionality and data of the mobile application more industry specific such as financials, high technology, etc. In an example, by dragging and dropping a sales widget into the mobile application creation interface 308, the mobile application development software 202 populates most of the fields, underlying functionality, and application programming interfaces (APIs) 207 for backend integration required to launch a sales application. The mobile application development software 202 enables the user to also rename a field name and also add additional fields in the mobile application creation interface 308. The mobile application development software 202 also enables the user to combine different or complimentary widgets to create mashup applications.

Figure 6B:
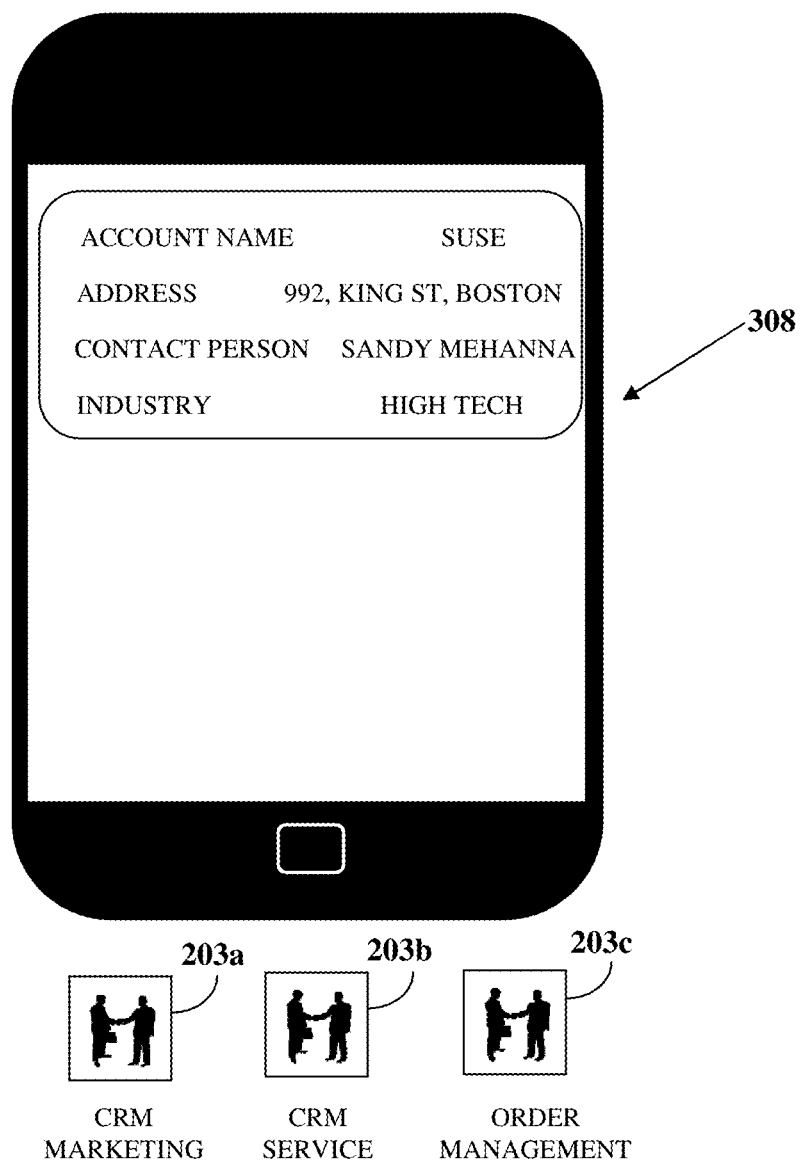

FIG. 6B exemplarily illustrates software components inserted into the mobile application creation interface 308 of the mobile application. The mobile application development software 202 inserts a smart widget selected by the user, for example, the smart widget for CRM marketing 203a, into the launched mobile application creation interface 308. The smart widget for CRM marketing 203a displays data, for example, an account name, an address, a contact person, an industry, etc.

Figure 6C:
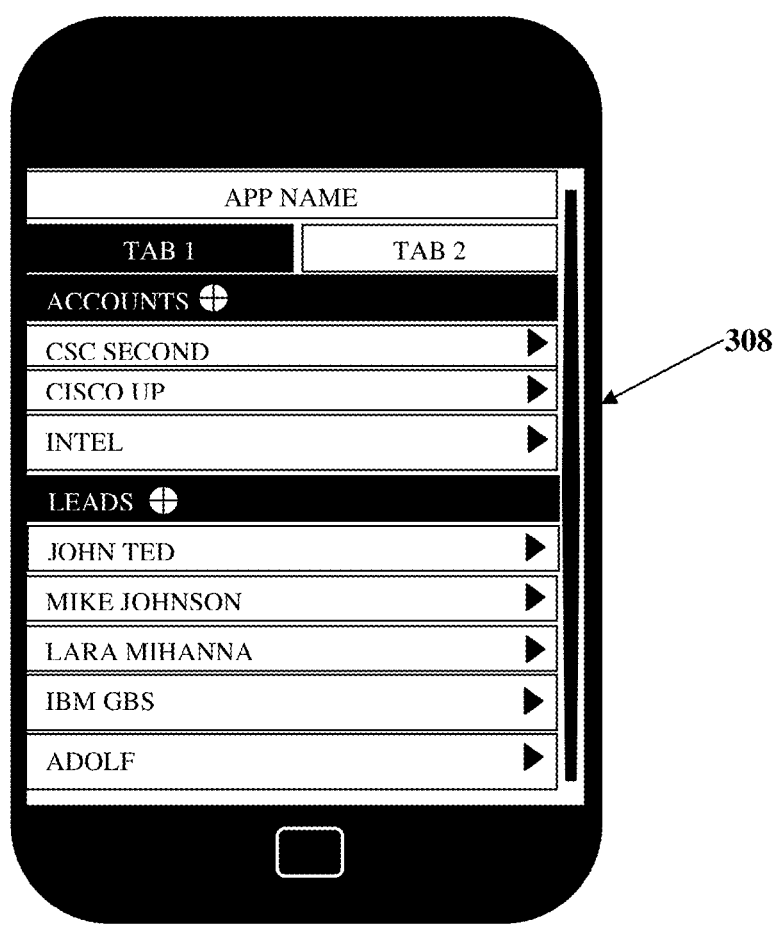
Figure 6D:
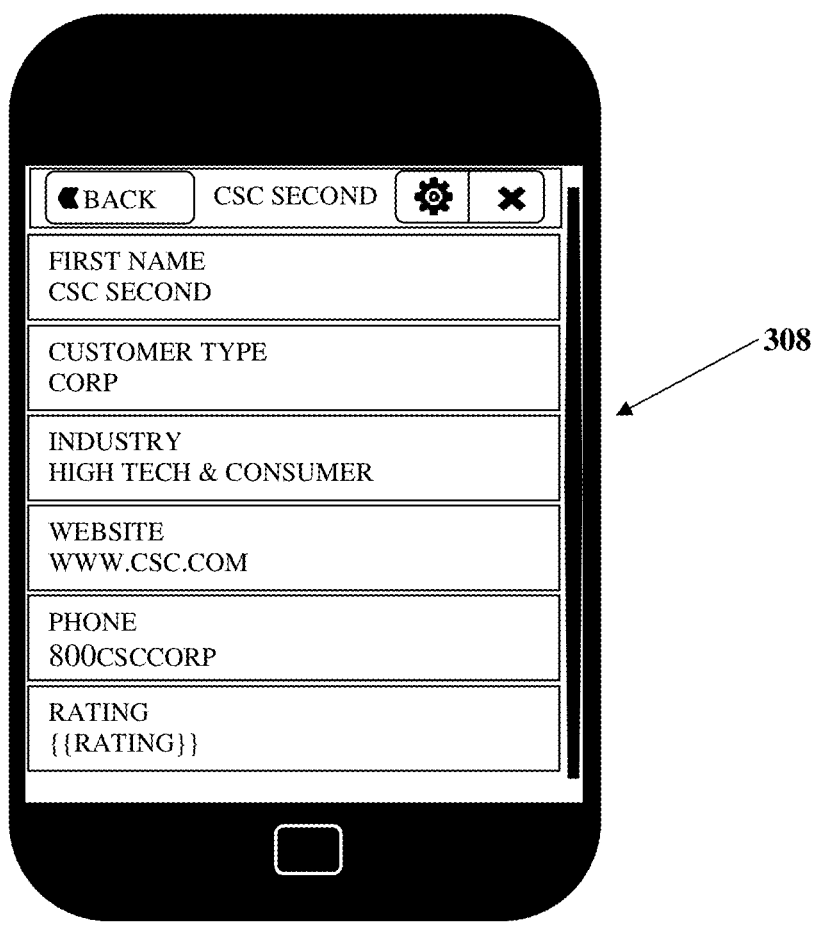

FIGS. 6C-6D exemplarily illustrate software components comprising hierarchical layers of data. The mobile application development software 202 inserts pre-coded software components 307 and/or composite software components, for example, smart widgets 203a, 203b, and 203c exemplarily illustrated in FIGS. 6A-6B, mashup applications, etc., selected by the user in the launched mobile application creation interface 308. Based on the data mapping disclosed in the detailed description of FIG. 1 and FIG. 8, each of the software components shows different data sets. The inserted pre-coded software components 307, for example, an accounts widget, a leads widget, etc., comprise hierarchical layers of data. That is, each widget can contain multiple layers of pages of data. The fields shown on a page is defined in the mappings dynamically mapped by the user. The same widget shows different data sets based on the mappings. As exemplarily illustrated in FIG. 6C, the accounts widget comprises fields such as "CSC Second", "Cisco up", "Intel", etc., and the leads widget comprises fields such as "John Ted", "Mike Johnson", "Lara Mihanna", etc. By clicking on the "CSC Second" field of the accounts widget, the user is navigated to a new page comprising fields, for example, first name, customer type, industry, website, phone, rating, etc., as exemplarily illustrated in FIG. 6D. The mobile application development software 202 defines business rules, for example, where users can select from only existing customer types.

Figure 6E:
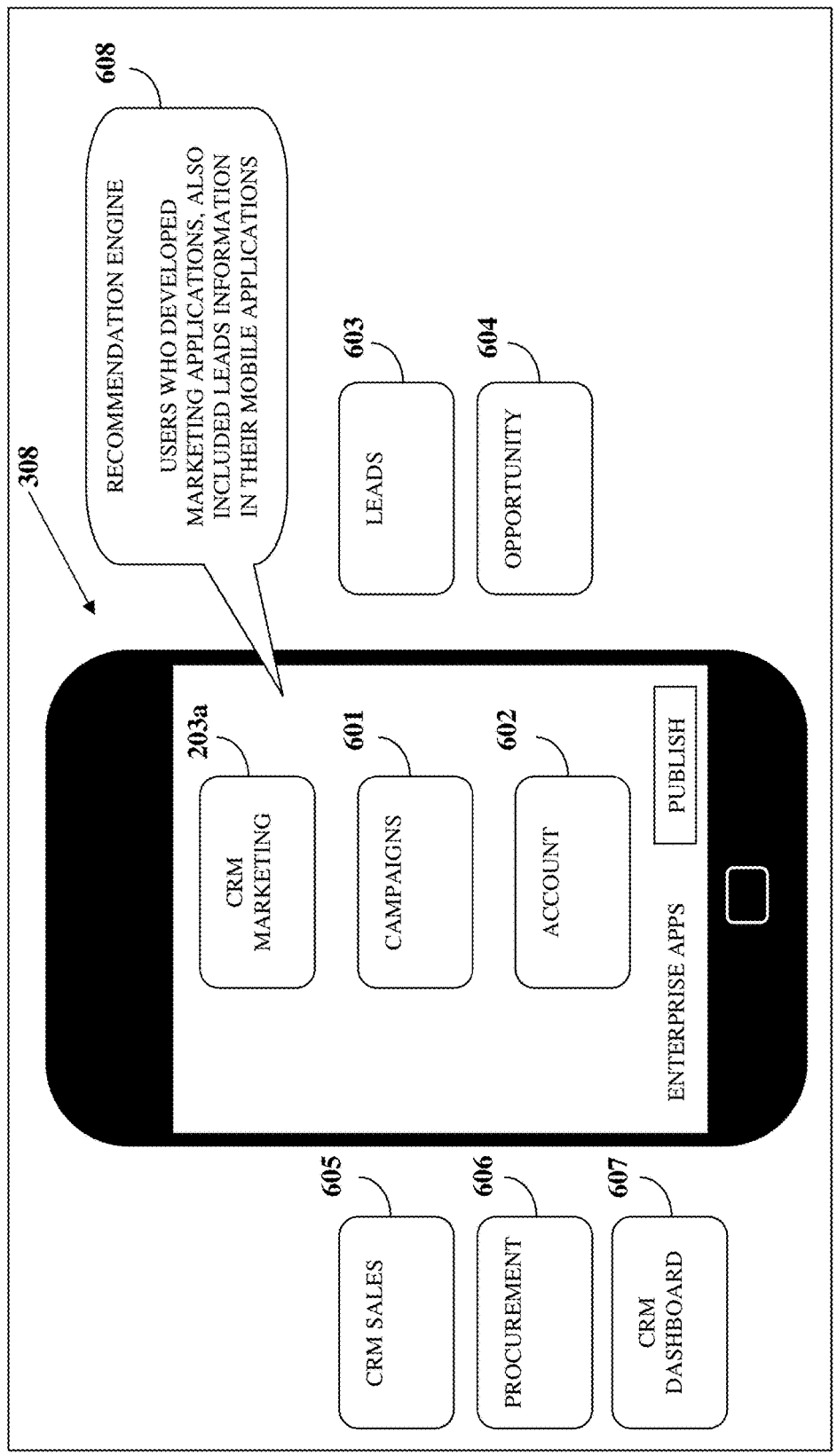

FIG. 6E exemplarily illustrates software components recommended by the mobile application development software 202 for creation of a mobile application. Consider an example where a user developing a marketing mobile application includes widgets such as CRM marketing 203a, campaigns 601, account 602, etc., in the marketing application. The recommendation engine 205 of the mobile application development software 202 generates one or more recommendations for addition of one or more characteristic objects associated with the marketing mobile application. As exemplarily illustrated in FIG. 6E, the recommendation engine 205 generates a recommendation 608 for adding a leads widget 603, an opportunity widget 604, etc., into the marketing mobile application. The recommendation 608 recites, for example, that users who developed marketing applications also included leads information in their mobile applications. Based on the type of mobile applications, for example, sales, marketing, etc., the recommendation engine 205 recommend widgets, for example, CRM sales 605, procurement 606, CRM dashboard 607, etc., for addition into the mobile application.

Figure 6F:
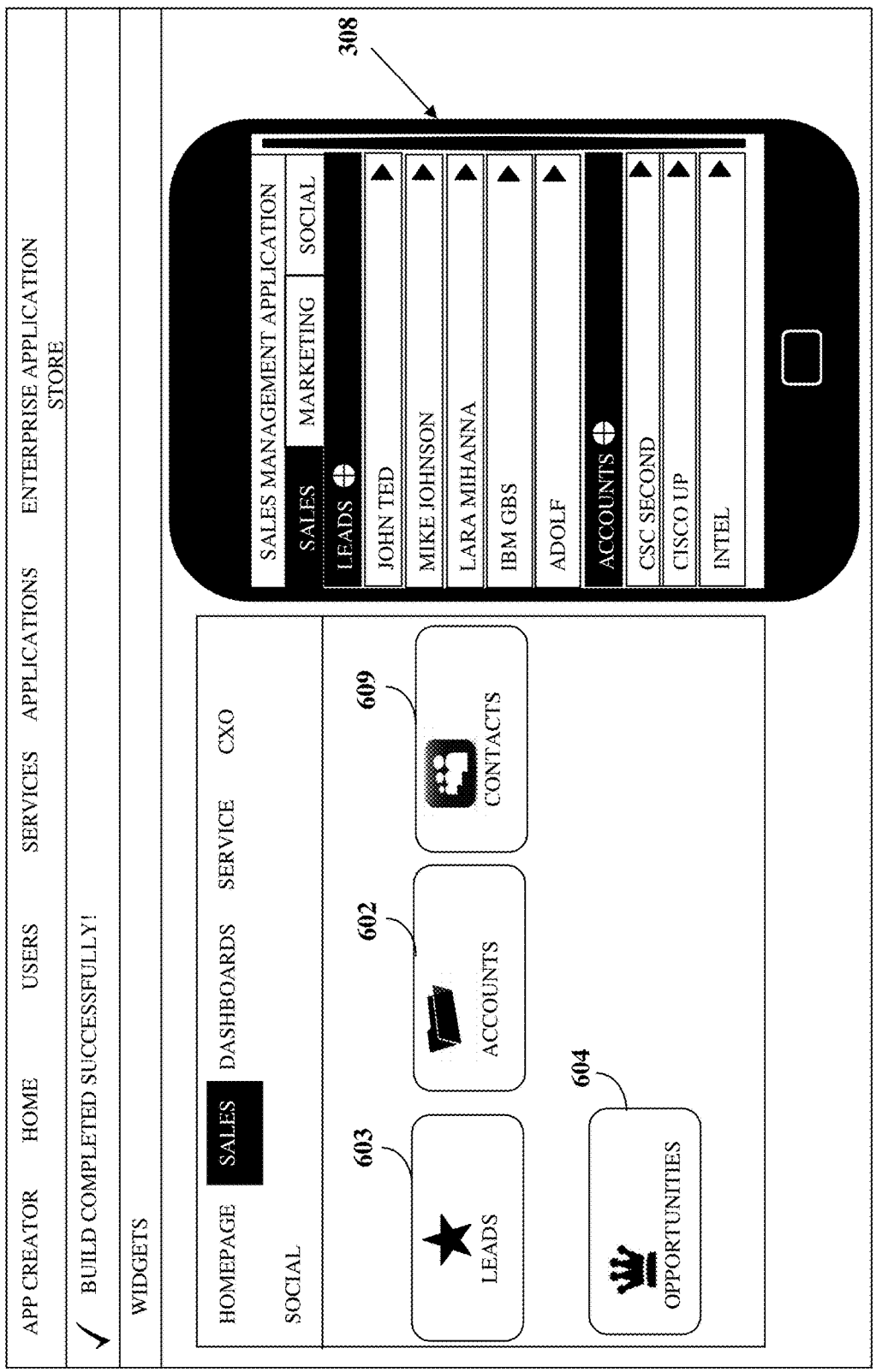
FIGS. 6F-6G exemplarily illustrate screenshots showing creation of a mobile application for a user device.
Figure 6G:
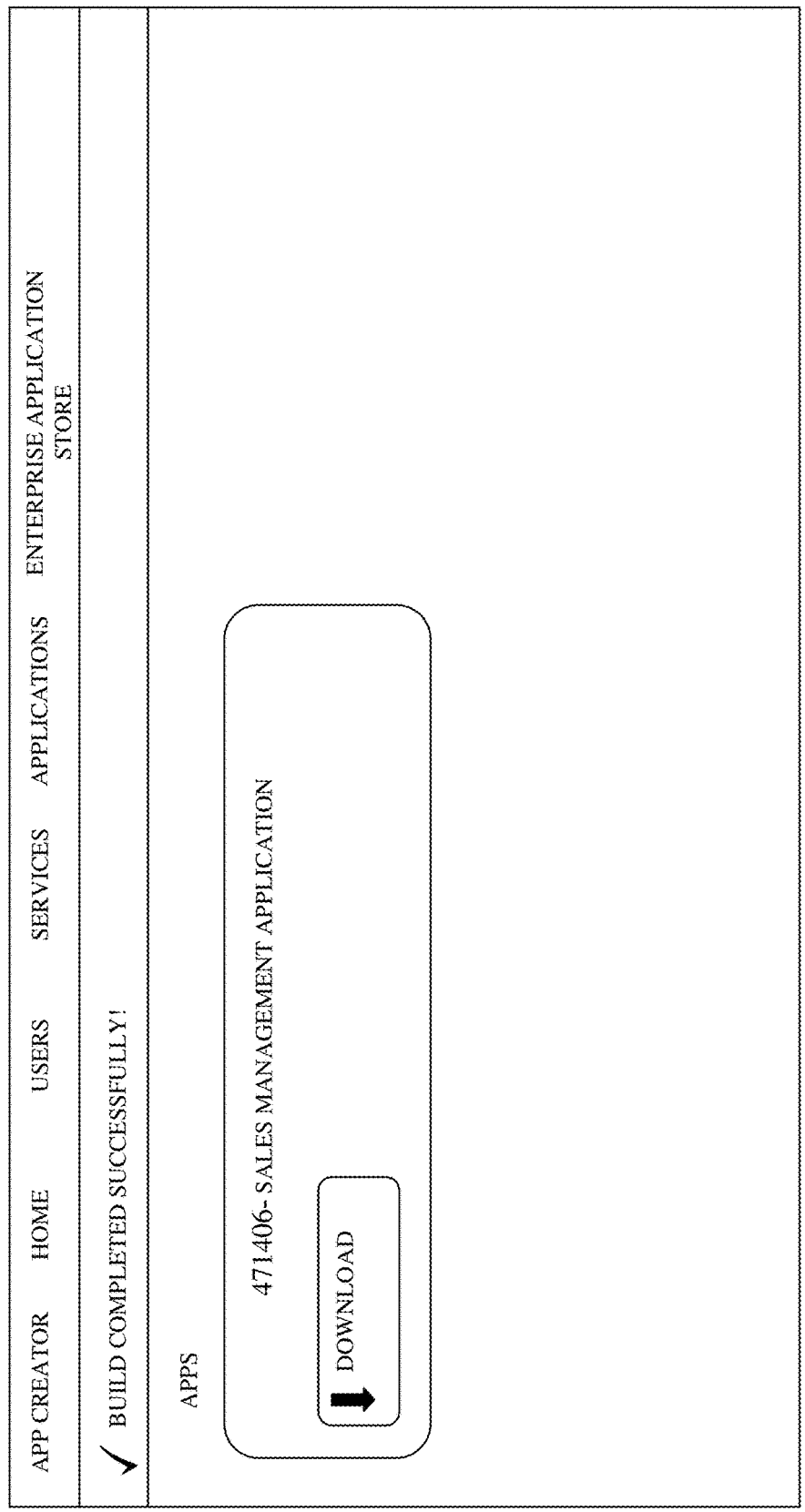

FIGS. 6F-6G exemplarily illustrate screenshots showing creation of a mobile application for a user device 201 exemplarily illustrated in FIGS. 2-3. FIG. 6F exemplarily illustrates a display page provided by the mobile application development software 202 for creating a mobile application. The mobile application development software 202 provides multiple pre-coded software components 307, for example, a leads widget 603, an accounts widget 602, a contacts widget 609, an opportunity widget 604, etc., as exemplarily illustrated in FIG. 6F, on the display page to a user developing, for example, a sales management application. The user, based on his/her requirement, selects and inserts the pre-coded software components 307, for example, an accounts widget 602, a leads widget 603, etc., by dragging and dropping the pre-coded software components 307 into the mobile application creation interface 308 for creating the sales management application.

FIG. 6G exemplarily illustrates a display page provided by the mobile application development software 202 for accessing and downloading the created mobile application to a user device 201. The mobile application development software 202 provides access to the created mobile applications on the display page for digital distribution to end users. The mobile application development software 202 provides a link to an enterprise application store 210 exemplarily illustrated in FIGS. 2-3 on the display page. When an end user clicks the link to the enterprise application store 210 on the display page, the mobile application development software 202 displays the created mobile applications available at the enterprise application store 210. An end user who wishes to make use of a created mobile application, for example, a sales management application, can download the sales management application from the enterprise application store 210 directly onto the user device 201.

Figure 7:
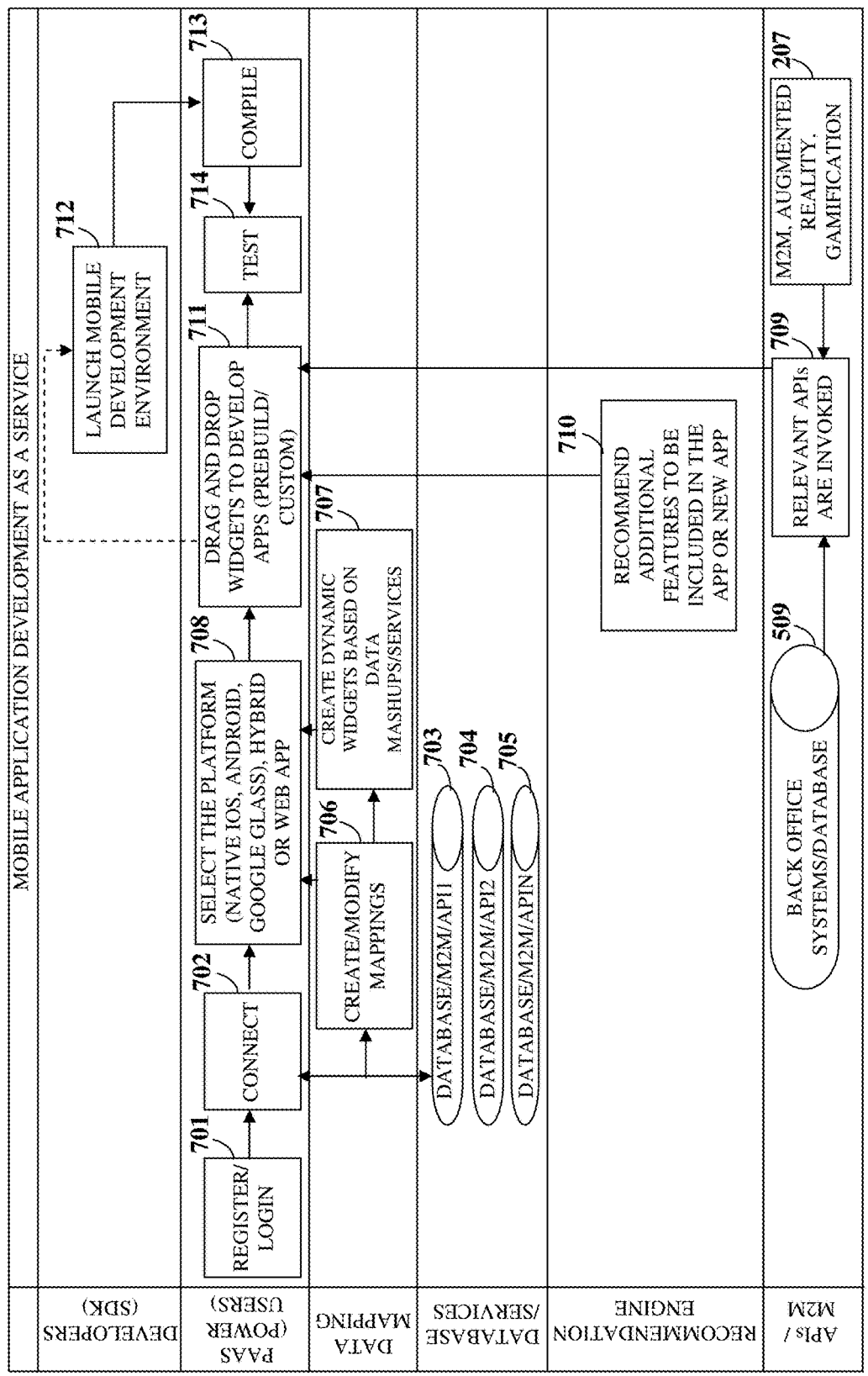
FIG. 7 exemplarily illustrates a process flow diagram showing the steps performed by the mobile application development software for creating a mobile application for a user device.

FIG. 7 exemplarily illustrates a process flow diagram showing the steps performed by the mobile application development software 202 for creating a mobile application for a user device 201 exemplarily illustrated in FIGS. 2-3. The mobile application development software 202 offers creation and development of the mobile application as a service. The mobile application development software 202 enables a user to register 701 for the service if the user has not registered already, or login to the mobile application development software 202 using a user identifier and a password. The mobile application development software 202 then connects 702 to the relevant databases 703, 704, and 705 comprising data from multiple data sources. The user selects 708 a platform, for example, iOS® of Apple Inc., Android of Google Inc., etc. The mobile application development software 202 dynamically creates or modifies 706 mappings of the data to be rendered in the mobile application with one or more of multiple data sources based on the selected platform, for example, iOS® of Apple Inc., Android of Google Inc., etc.

The mobile application development software 202 provides pre-coded software components 307, for example, smart widgets 203, micro widgets, etc., that allow the user to create the mobile application. In an embodiment, the mobile application development software 202 enables a user to create 707 dynamic software components, for example, widgets based on the data. The mobile application development software 202 then allows the user to drag and drop 711 one or more pre-coded software components 307 and/or composite software components, for example, smart widgets 203 to create the mobile applications using the drag and drop option. For example, a user selects the smart widgets 203 to be added to the mobile application creation interface 308 exemplarily illustrated in FIG. 3, which may be prebuilt or customized by the user, and drops the selected smart widgets 203 by dragging the smart widgets 203 to the mobile application creation interface 308. The mobile application development software 202 generates recommendations 710 to the user who initiates creation of the mobile application for addition of characteristic objects, that is, additional features to be included in the mobile application. Consider an example where a user developing a calendar application decides to include a date, a time, and a time zone in the mobile application. The mobile application development software 202 recommends, for example, electronic mail (email) integration to the calendar application.

The mobile application development software 202 enables backend integration of the mobile application with the user device 201 via application programming interfaces (APIs) 207. The mobile application development software 202 invokes 709 relevant APIs 207, for example, for machine to machine convergence, gamification, augmented reality, etc., in communication with the systems and/or databases of the back office component 509. The mobile application development software 202 configures the APIs 207 for each organization, as the types of user devices 201 used are different for each organization. The mobile application development software 202 comprises an administration module (not shown) that allows organizations to provide an enterprise information technology (IT) landscape such as the type of IT systems, for example, Oracle, Sybase, SAP, etc., used. Once the APIs 207 are configured by the mobile application development software 202, the APIs 207 for the backend systems become active and are used while developing the mobile application. In an embodiment, the APIs 207 of the mobile application development software 202 are preconfigured to connect to various data sources. The mobile application development software 202 creates the mobile application in the mobile application creation interface 308 by using the inserted pre-coded software components 307 and the composite software components, the generated recommendations, the dynamically mapped data, and the adaptively configured application programming interfaces 207. The developers, using a software development kit (SDK) of the mobile application development software 202, launch 712 a mobile development environment and enable power users to compile 713 the created mobile application and test 714 the created mobile application.

Figure 8:
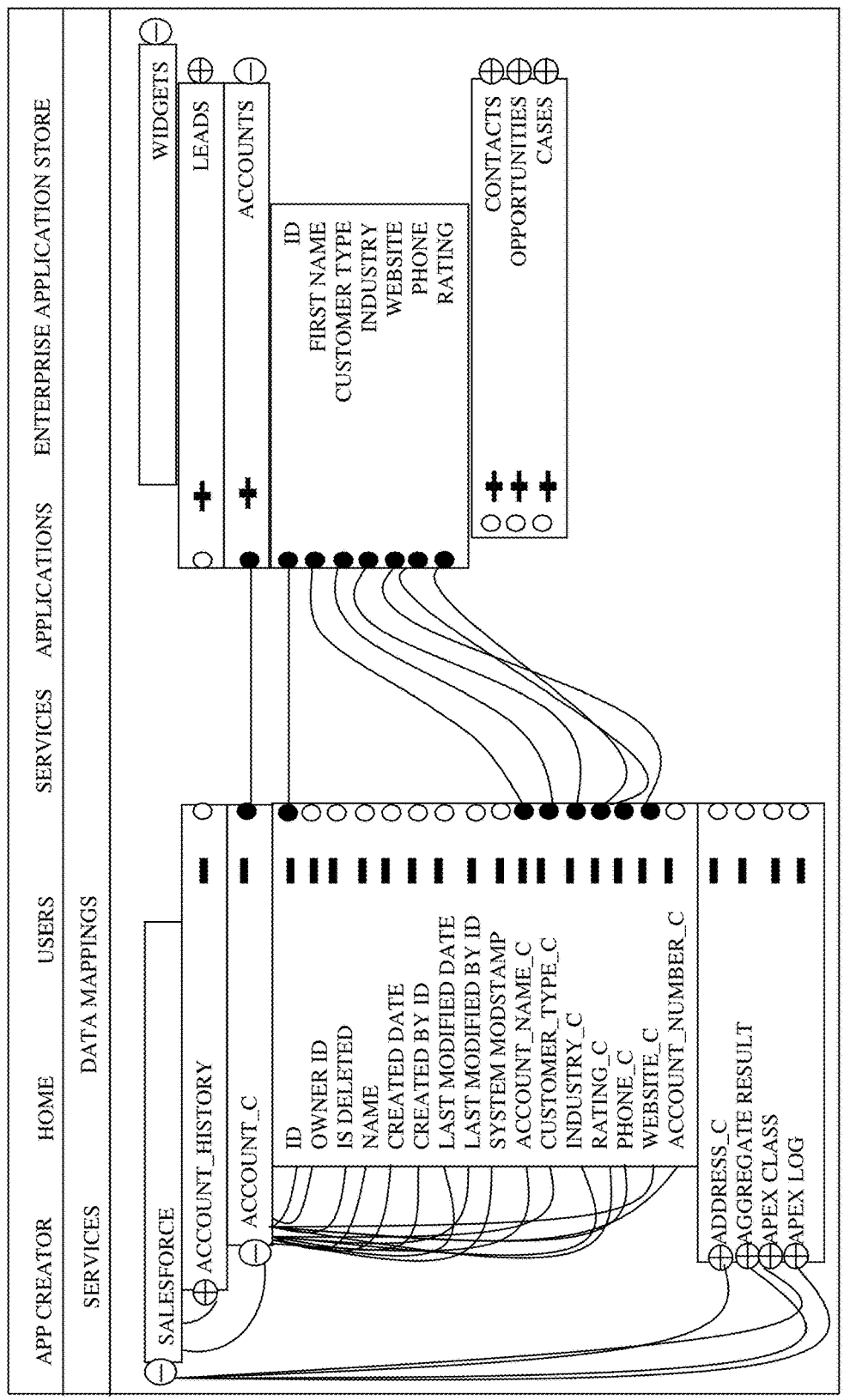
FIG. 8 exemplarily illustrates a screenshot showing dynamic mapping of data to be rendered in a mobile application.

FIG. 8 exemplarily illustrates a screenshot showing dynamic mapping of data to be rendered in a mobile application. The mobile application development software 202 exemplarily illustrated in FIGS. 2-3 enables users to dynamically map the data to be rendered in the mobile application, add new fields, and add new software components such as widgets as exemplarily illustrated in FIG. 8. A user developing a mobile application, for example, a sales application logs into the mobile application development software 202. The user selects pre-coded software components 307 and/or composite software components for creating the mobile application. The pre-coded software components 307 and the composite software components are stored, for example, in a local database 204 exemplarily illustrated in FIGS. 2-3, a backend database, or a remote database. The pre-coded software components 307 and the composite software components comprise one or more fields of data. For example, a sales force widget comprises fields such as account history, address, etc., with sub fields "id", "owner id", "name", "created date", "created by id", "account name", "customer type", "industry", "rating", "phone", "website", etc. When a user drags and drops the sales force widget on the mobile application creation interface 308 of the user device 201 exemplarily illustrated in FIG. 3, the mobile application development software 202 renders only the mapped fields, for example, "id", "account name", "customer type", "industry", "rating", "phone", "website", etc., in the created mobile application. The mapped fields are chosen based on the user requirement. For example, if a user wants to display only 5 fields of the sales widget in the created mobile application, the mobile application development software 202 maps only the 5 fields of the sales widget selected by the user.

Figure 9:
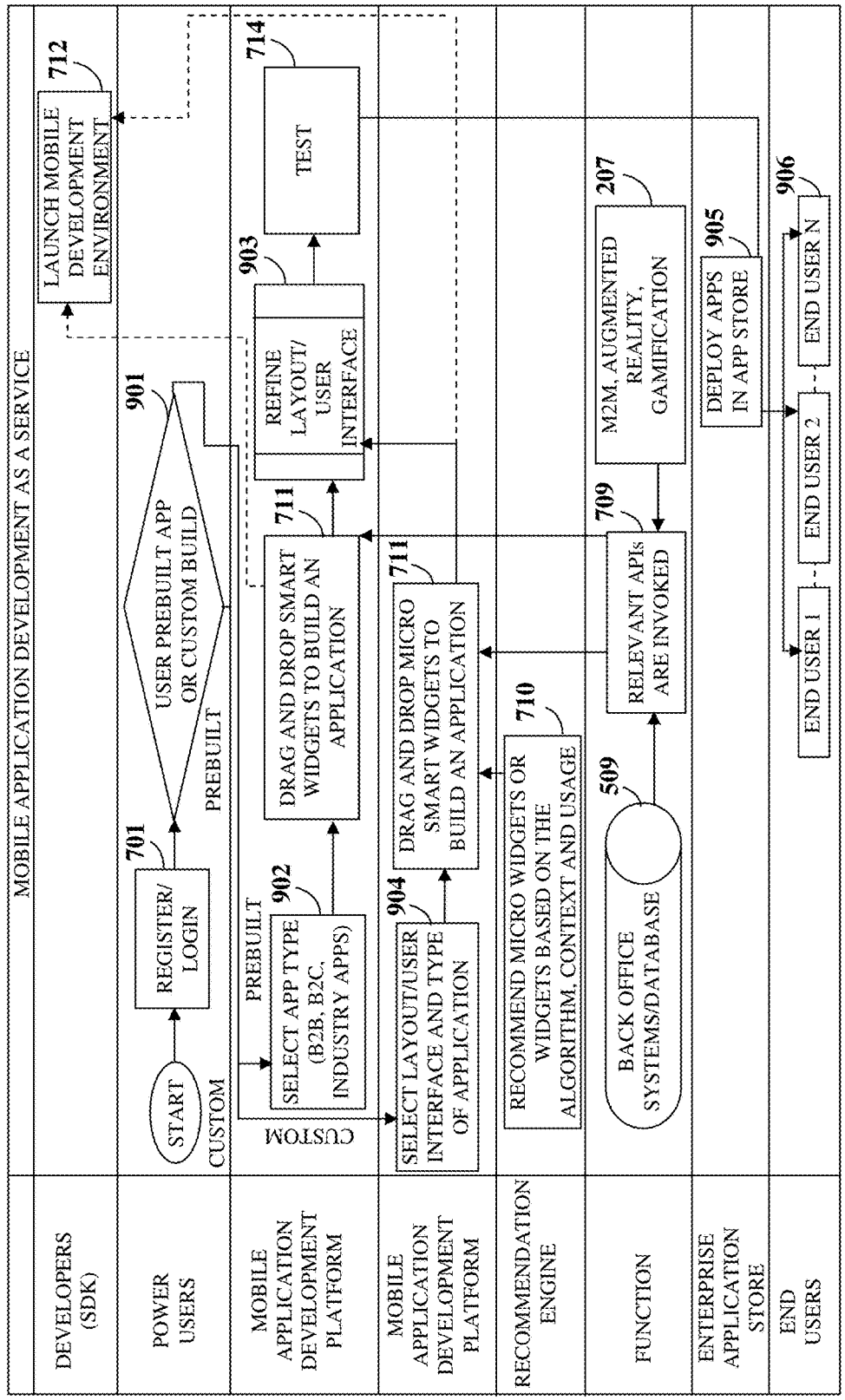
FIG. 9 exemplarily illustrates a process flow diagram showing the steps performed by the mobile application development software for creating a mobile application for a user device and deploying the created mobile application in an enterprise application store.

FIG. 9 exemplarily illustrates a process flow diagram showing the steps performed by the mobile application development software 202 exemplarily illustrated in FIGS. 2-3, for creating a mobile application for a user device 201 and deploying the created mobile application in an enterprise application store 210. The mobile application development software 202 hosted on the mobile application development platform 209 enables a power user to register 701 with the service if the power user has not already registered, or login to the mobile application development software 202 with a user identifier and a password. The mobile application development software 202 launches the mobile application creation interface 308 exemplarily illustrated in FIG. 3, using a prebuilt user interface or a custom built user interface 901. If the mobile application creation interface 308 is launched using a prebuilt user interface, the mobile application development software 202 enables the user to select 902 an application type for creation of the mobile application, for example, a business-to-business (B2B) type, a business-to-consumer (B2C) type, an industry application type, etc. The mobile application development software 202 then allows the user to drag and drop 711 one or more pre-coded software components 307 and/or composite software components, for example, smart widgets 203 to create the mobile application using the drag and drop option. In an example, a user selects the smart widgets 203 to be added to the mobile application and drops the selected smart widgets 203 by dragging the smart widgets 203 to the mobile application creation interface 308. For a custom built user interface, the mobile application development software 202 enables the user to select 904 the layout, user interface, and application type. The mobile application development software 202 then allows the user to drag and drop 711 one or more pre-coded software components 307 and/or composite software components, for example, smart widgets 203 to create the mobile application using the drag and drop option. The user can refine 903 and make minor modifications to the layout of the user interface by selecting a user interface pattern. The layouts of the user interface comprise, for example, a springboard, a list, a tab, a metaphor, a dashboard, etc. The user may then select micro widgets that are designed at an entity level and can be combined to develop a fully functional mobile application. For example, a sales based mobile application requires micro widgets such as account information, contacts, leads, opportunities, etc. The user can select these micro widgets to develop a customized enterprise mobile application.

The recommendation engine 205 of the mobile application development software 202 generates recommendations for the user developing the mobile application for addition of characteristic objects associated with the mobile application. The recommendation engine 205 recommends 710 micro widgets or widgets based on a method disclosed in the detailed description of FIG. 12, context, and usage. The mobile application development software 202 enables backend integration of the mobile application with the user device 201 via application programming interfaces (APIs) 207. For example, the mobile application development software 202, in communication with the back office component 509 comprising back office systems and/or databases, invokes 709 the relevant APIs 207 such as machine to machine convergence, gamification, augmented reality, etc., for achieving backend integration of the mobile application with the user device 201. Once the APIs 207 are configured by the mobile application development software 202, the APIs 207 for the backend systems become active and are used while creating the mobile application. In an embodiment, the APIs 207 of the mobile application development software 202 are preconfigured to connect to various data sources. In another embodiment, the mobile application development software 202 enhances the mobile application features by allowing the user to integrate with additional APIs 207 such as social, near field communication, etc.

The mobile application development software 202 creates the mobile application in the mobile application creation interface 308 by using the inserted pre-coded software components 307 and the composite software components, the generated recommendations, the dynamically mapped data, and the adaptively configured application programming interfaces 207. The user refines 903 the created mobile application in terms of layout and the user interface. The developers, using a software development kit (SDK) of the mobile application development software 202, launch 712 a mobile development environment and enable the mobile application development platform 209 to compile the created mobile application and test 714 the created mobile application. The created mobile application can be packaged into binary files for different platforms such as iOS® of Apple Inc., Android of Google Inc., and deployed 905, for example, on an internal enterprise application store 210, public stores such as Apple Inc.'s appstore, Google Inc.'s play store, etc. An end user 906 can access the created mobile application from the internal enterprise application store 210, public stores, etc.

Figure 10:
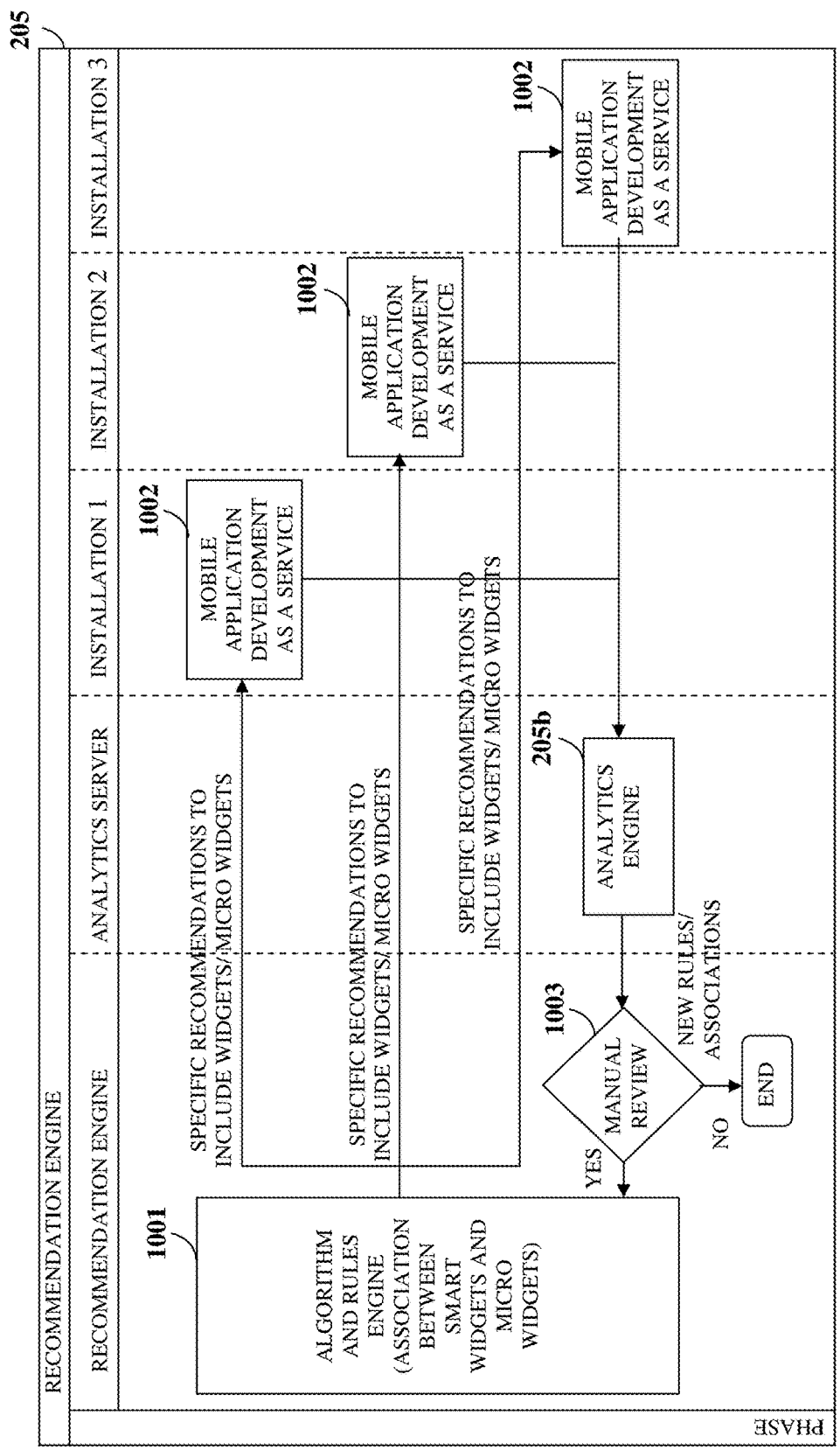
FIG. 10 exemplarily illustrates a process flow diagram showing the steps performed by a recommendation engine of the mobile application development software.

FIG. 10 exemplarily illustrates a process flow diagram showing the steps performed by the recommendation engine 205 of the mobile application development software 202 exemplarily illustrated in FIGS. 2-3. The recommendation engine 205 generates recommendations using the analytics engine 205b, also referred to as an "awareness engine", as disclosed in the detailed description of FIG. 12, for addition of characteristic objects associated with the mobile application. The recommendation engine 205 recommends features to be included in the mobile application based on algorithms and rules set by an algorithms and rules engine 1001, real time data analysis and dynamic learning of selective data of the industry and other similar mobile applications performed by the analytics engine 205b. The recommendation engine 205, in communication with the analytics engine 205b, uses the algorithms and rules, for example, an association between software components such as the smart widgets 203, micro widgets, etc., and initial recommendations, and also uses anonymous real time data from all instances collected by the analytics engine 205b in order to recommend specific nuanced features for the mobile application. For example, the algorithms and rules engine 1001 of the recommendation engine 205 recommends specific widgets and micro widgets to be included in the mobile application to the mobile application development software 202 being offered as a service 1002. The analytics engine 205b analyzes the specific recommendations and suggests new rules and/or associations. A manual review 1003 of the suggested new rules and/or associations is performed and the user may accept or reject the suggested new rules and/or associations. The recommendation engine 205 analyzes and reviews data from various sources and updates the recommendations based on the data collected. For example, a user developing a shopping mobile application decides to include product information, a store locator, and an inventory lookup. The recommendation engine 205 is configured to recommend other features based on the usage from other users. In this example, the recommendation engine 205 may recommend the user to include a price lookup functionality based on other similar mobile applications developed in the same industry.

Figure 11:
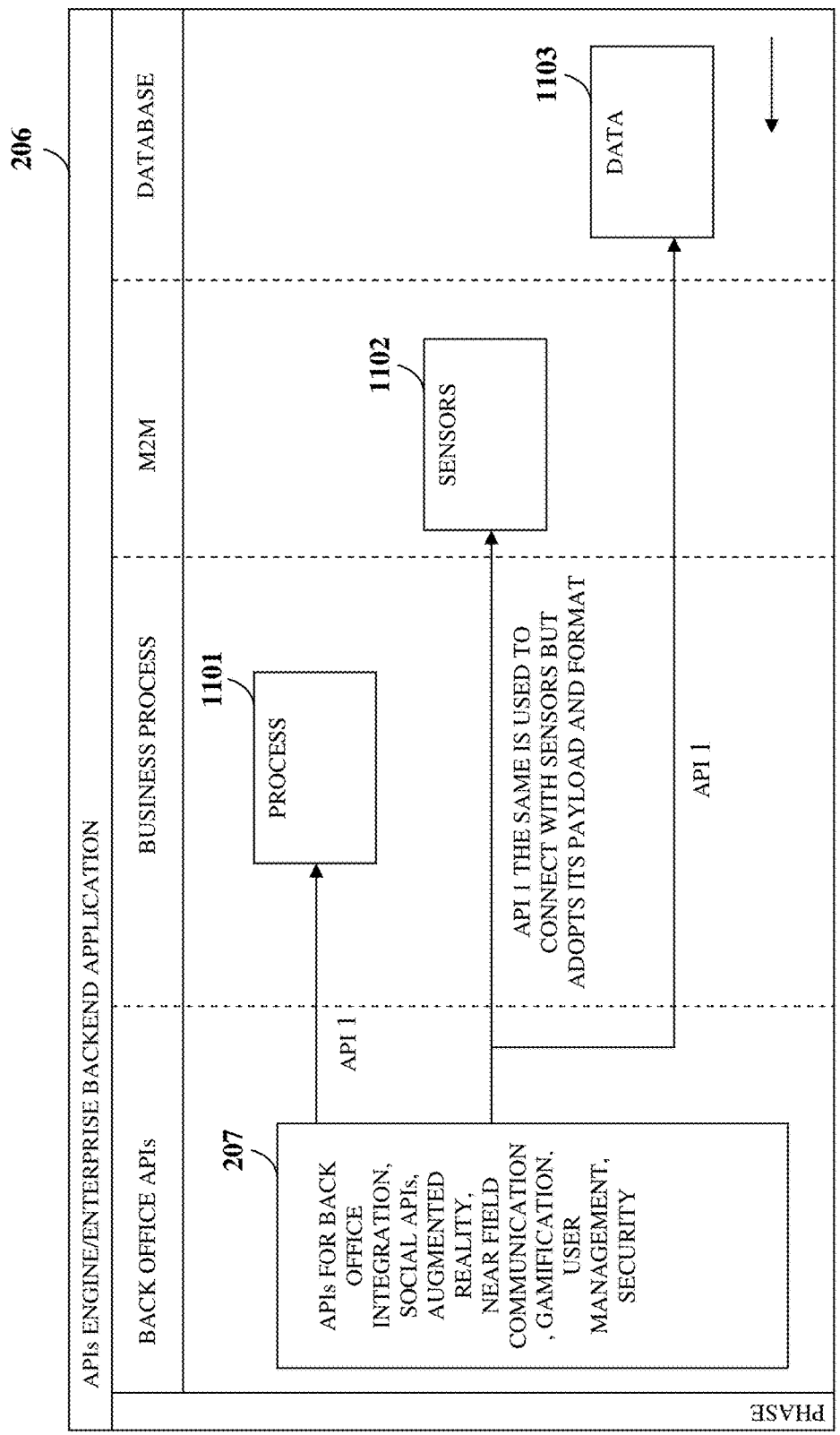
FIG. 11 exemplarily illustrates a process flow diagram showing the steps performed by a backend integration module of the mobile application development software.

FIG. 11 exemplarily illustrates a process flow diagram showing the steps performed by the backend integration module 305 of the mobile application development software 202 exemplarily illustrated in FIG. 3. The backend integration module 305 is also referred to as an application programming interface engine or an enterprise backend application 206. The backend integration module 305 enables standard backend integration via the APIs 207 and does not require additional programming. For example, the APIs 207 are used for backend integration with other systems, for example, back office systems such as sensors 1102, augmented reality, near field communication, social, gamification, user management, security, etc. The backend integration module 305 also enables the APIs 207 that can adapt their behavior based on the type of connection such as sensor 1102, data 1103, process 1101, etc. The APIs 207 can minimize data payload and adapt the format to communicate with sensors 1102, machine to machine (M2M), as well as databases. The APIs 207 also enable process to machine (P2M) communication and M2M social networking. M2M APIs 207 allow users to communicate with sensors 1102 which share and exchange data with other similar sensors and adopt their behavior accordingly.

Figure 12:
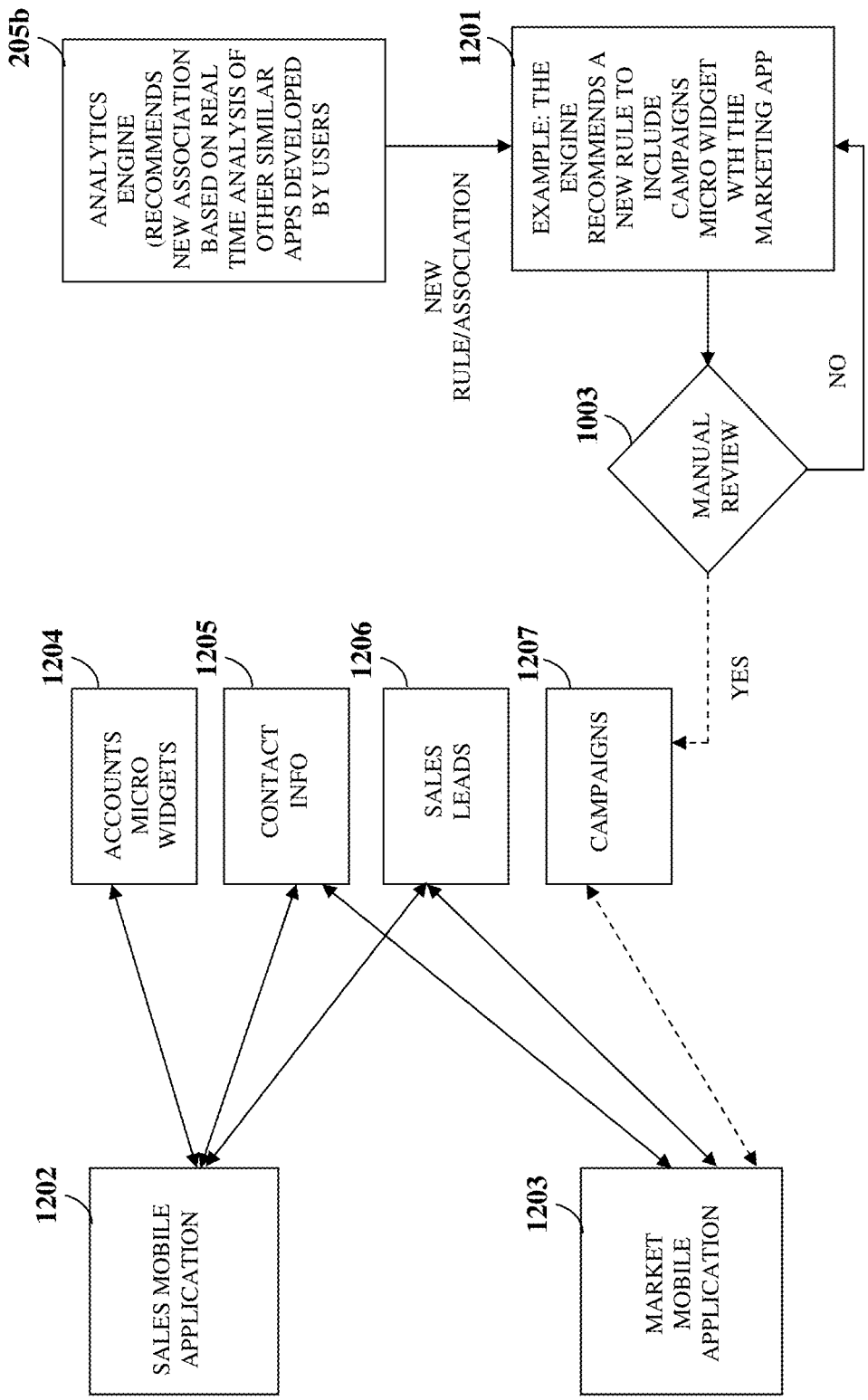
FIG. 12 exemplarily illustrates a process flow diagram showing the steps performed by the recommendation engine using an analytics engine of the mobile application development software.

FIG. 12 exemplarily illustrates a process flow diagram showing the steps performed by the recommendation engine 205 using the analytics engine 205b of the mobile application development software 202 exemplarily illustrated in FIGS. 2-3. The recommendation engine 205 implements an algorithm that has many to many relationships between a mobile application and characteristic objects using the analytics engine 205b. For example, a sales mobile application 1202 of a sales application type is associated with micro widgets such as accounts 1204, contact information 1205, sales leads 1206, etc. A marketing mobile application 1203 of a marketing application type is associated with micro widgets such as contact information 1205, sales leads 1206, campaigns 1207, etc. The analytics engine 205b, also referred to as an "awareness engine", performs a real time analysis of other similar mobile applications developed by other users to recommend new associations based on the real time analysis. A user developing, for example, a sales mobile application 1202 and a marketing mobile application 1203 would obtain recommendations based on the association of the sales mobile application 1202 and the marketing mobile application 1203 with their respective micro widgets. The recommendation engine 205 updates the associations based on the real time analysis and dynamic learning of selective data of other similar applications developed by other users. The analytics engine 205b recommends 1201 a new rule to include, for example, a campaigns micro widget 1207 to the marketing mobile application 1203. The recommendation engine 205 allows for a manual review 1003 or verification of every new association rule prior to generation of the recommendations. Based on the manual review 1003, the recommendation of including, for example, a campaigns micro widget 1207 to the marketing mobile application 1203 is either accepted or rejected by the user.

Figure 13:
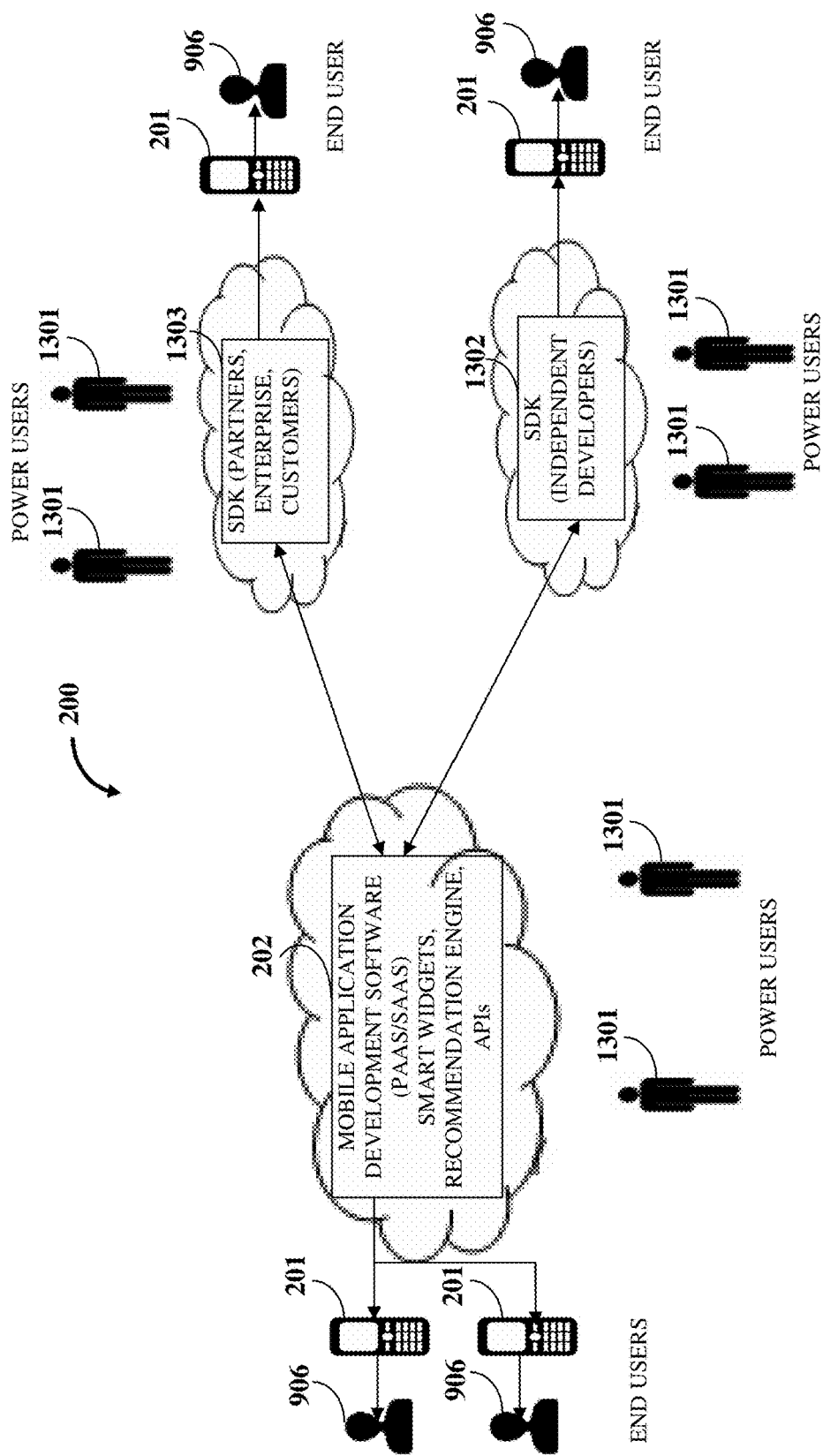
FIG. 13 exemplarily illustrates the computer implemented system comprising the mobile application development software hosted in a cloud computing environment accessible by power users and developers for creating mobile applications for end users.

FIG. 13 exemplarily illustrates the computer implemented system 200 comprising the mobile application development software 202 hosted in a cloud computing environment accessible by power users 1301 and developers for creating mobile applications for end users 906. The mobile application development software 202 employs a cloud computing platform provided by cloud computing vendors, for example, Amazon® of Amazon Technologies, Inc. Windows Azure® of Microsoft Corporation, Rackspace® of Rackspace US, Inc., etc. The mobile application development software 202 enables power users 1301 to change the layout of pre-coded software components 307, for example, the smart widgets 203 exemplarily illustrated in FIG. 2, or the micro widgets. For example, when a widget is dragged and dropped in the mobile application creation interface 308 exemplarily illustrated in FIG. 3 and FIGS. 6A-6F, the power users 1301 can change the layout from a list menu to a tab menu or any other design pattern such as a springboard, a gallery, a metaphor, a mega menu, etc. In an embodiment, the pre-coded software components 307 are configurable for allowing developers to generate supplementary software components such as smart widgets 203 and micro widgets using the mobile application development software 202. For example, the mobile application development software 202 allows independent developers to use a software development kit (SDK) 1302 of the mobile application development software 202 to develop smart widgets 203, micro widgets, etc., in order to adopt the mobile application development software 202 on a mass scale. In another example, the mobile application development software 202 allows independent developers to develop a consumer related widget, an enterprise focused widget, etc., that can be leveraged by users to add more features to either their existing mobile application or to build a new mobile application. The mobile application development software 202 also allows partners, enterprise customers, etc., to use a software development kit (SDK) 1303 of the mobile application development software 202 to create, for example, enterprise grade mobile applications. The end users 906 can access the created mobile application from the internal enterprise application store 210, public stores, etc., via their user devices 201.

It will be readily apparent that the various methods, algorithms, and computer programs disclosed herein may be implemented on computer readable media appropriately programmed for general purpose computers, computing devices, and wearable devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal.

Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Fortran, Ruby, Pascal, Perl®, Python®, Visual Basic®, MATLAB®, etc. Other object-oriented, functional, scripting, and/or logical programming languages may also be used. The computer program codes or software programs may be stored on or in one or more mediums as object code. Various aspects of the method and system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof. The computer program product disclosed herein comprises computer executable instructions embodied in a non-transitory computer readable storage medium, wherein the computer program product comprises one or more computer program codes for implementing the processes of various embodiments.

Where databases are described such as the databases 204 and 205*a*, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices may comprise processors, for example, the Intel® processors, Advanced Micro Devices (AMD®) processors, UltraSPARC® processors, hp® processors, International Business Machines (IBM®) processors, RISC based computer processors of ARM Holdings, Motorola® processors, etc., that are adapted to communicate with the computers. In an embodiment, each of the computers is equipped with a network communication device, for example, a network interface card, a modem, or other network connection device suitable for connecting to a network. Each of the computers and the devices executes an operating system, for example, the Linux® operating system, the Unix® operating system, any version of the Microsoft® Windows® operating system, the Mac OS of Apple Inc., the IBM® OS/2, the Palm OS®, the Android® OS, the Blackberry® OS, the Solaris operating system developed by Sun Microsystems, Inc., or any other operating system. Handheld devices execute operating systems, for example, the Android operating system, the Windows Phone™ operating system of Microsoft Corporation, the BlackBerry® operating system of Research in Motion Limited, the iOS operating system of Apple Inc., the Symbian® operating system of Symbian Foundation Limited, etc. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method, comprising:
receiving a selection of a plurality of pre-coded software components, wherein said pre-coded software components are provided by a mobile application development software accessible from a user device via a network, and wherein said pre-coded software components are fully developed mobile applications executable by at least one processor;
creating a new mobile application by launching a mobile application creation interface, wherein said creating said new mobile application in said launched mobile application creation interface further comprises:
inserting one or more of said pre-coded software components into said launched mobile application creation interface;
assembling said inserted one or more of said pre-coded software components;
using, by said mobile application development software, one or more adaptively configured application programming interfaces fora backend integration of said new mobile application with said user device for operating said new mobile application on said user device, wherein said one or more adaptively configured application programming interfaces are configured to implement one or more of a backend integration, a machine to machine or internet of things (IOT) data convergence, a process to machine data interaction for enabling one or more of a gamification, an augmented reality, or a near field communication, or a communication and exchange of data between said new mobile application and said user device;
connecting, by said mobile application development software, to a plurality of backend databases via said network for creating one or more enhanced mobile applications; and
providing, by said mobile application development software, direct access to one or more of web services or said one or more adaptively configured application programming interfaces from a web address; and
transmitting said new mobile application to an application store for publishing and distribution, wherein other users can download said new mobile application by accessing said application store directly from their user devices.

2. A mobile application development system, comprising:
at least one processor;
a non-transitory computer readable storage medium communicatively coupled to said at least one processor, said non-transitory computer readable storage medium configured to store a mobile application development software that, when executed by said at least one processor, causes said at least one processor to:
provide a selection of a plurality of pre-coded software components on a user device, wherein said mobile application development software is accessible from said user device via a network, and wherein said pre-coded software components are fully developed mobile applications executable by said at least one processor;
create a new mobile application by a mobile application creation module of said mobile application development software by launching a mobile application creation interface, wherein said mobile application creation module is configured to:
insert one or more pre-coded software components into said launched mobile application creation interface, by a component insertion module of said mobile application development software;
assemble said inserted one or more of said pre-coded software components, by a mobile application creation module of said mobile application development software; adaptively configure, by a backend integration module of said mobile application development software, one or more application programming interfaces for a backend integration of said new mobile application with said user device for operating said new mobile application on said user device, wherein said one or more adaptively configured application programming interfaces are configured to implement one or more of a backend integration, a machine to machine or internet of things (IOT) data convergence, a process to machine data interaction for enabling one or more of a gamification, an augmented reality, or a near field communication, or a communication and exchange of data between said new mobile application and said user device;
connect, by said backend integration module, said new mobile application to a plurality of backend databases via said network for creating one or more enhanced mobile applications; and
provide direct access to one or more of web services or said one or more adaptively configured application programming interfaces from a web address; and
transmit said new mobile application to an application store for publishing and distribution, wherein other users can download said new mobile application by accessing said application store directly from their user devices.

3. A non-transitory computer readable storage medium communicatively coupled to at least one processor, said non-transitory computer readable storage medium configured to store a mobile application development software that, when executed by said at least one processor, causes a mobile application development system to perform a method comprising:
receiving a selection of a plurality of pre-coded software components, wherein said pre-coded software components are provided by the mobile application development software accessible from a user device via a network, and wherein said pre-coded software components are fully developed mobile applications executable by said at least one processor;

creating a new mobile application by launching a mobile application creation interface in said user device, wherein said creation of said new mobile application comprises:
 inserting one or more of said pre-coded software components into said launched mobile application creation interface;
 assembling said inserted one or more of said pre-coded software components;
 using, by said mobile application development software, one or more adaptively configured application programming interfaces fora backend integration of said new mobile application with said user device for operating said new mobile application on said user device;
 connecting, by said mobile application development software, to a plurality of backend databases via said network for creating one or more enhanced applications; and
 providing, by said mobile application development software, direct access to one or more of web services or said one or more adaptively configured application programming interfaces from a web address; and providing said new mobile application from said user device to an application store for publishing and distribution, wherein other users can download said new mobile application by accessing said application store directly from their user devices.

4. A computer implemented method, comprising:
 allowing developers to submit pre-coded software components to an application library accessible by one or more users to build and deploy new mobile applications;
 enabling a backend integration of said new mobile applications with devices belonging to said users, wherein enabling said backend integration comprises:
  providing one or more adaptively configured application programming interfaces for operating said new mobile applications on said devices belonging to said users, wherein said one or more adaptively configured application programming interfaces are configured to implement one or more of a backend integration, a machine to machine or internet of things (IOT) data convergence, a process to machine data interaction for enabling one or more of a gamification, an augmented reality, or a near field communication, or a communication and exchange of data between said new mobile applications and user device;
  connecting said new mobile applications to a plurality of backend databases via a network for creating one or more enhanced mobile applications; and
  providing direct access to one or more of web services or said one or more adaptively configured application programming interfaces from a web address;
 providing an application delivery model to said users that supports hyper-personalization to assemble said new mobile applications on the fly rather than downloading and using a pre-built mobile application from an application store; and
  enabling said users to hyper-personalize said pre-built mobile application by one or more of modifying said pre-built mobile application or building said new mobile applications as per their own preferences without coding.

5. A method, comprising:
 receiving a selection of a plurality of pre-coded software components, wherein said pre-coded software components are provided by a mobile application development software accessible from a user device via a network, and wherein said pre-coded software components are fully developed mobile applications executable by at least one processor;
 creating a new mobile application by launching a mobile application creation interface in said user device, wherein said creation of said new mobile application comprises:
  inserting one or more of said pre-coded software components into said launched mobile application creation interface;
  assembling said inserted one or more of said pre-coded software components;
  using, by said mobile application development software, one or more adaptively configured application programming interfaces for a backend integration of said new mobile application with said user device for operating said new mobile application on said user device;
  connecting, by said mobile application development software, to a plurality of backend databases via said network for creating one or more enhanced applications; and
  providing, by said mobile application development software, direct access to one or more of web services or said one or more adaptively configured application programming interfaces from a web address; and
 providing said new mobile application from said user device to an application store for publishing and distribution, wherein other users can download said new mobile application by accessing said application store directly from their user devices.

6. The method of claim 1, further comprising:
 creating one or more composite software components by combining one or more distinct software components selected from a plurality of component sources and/or one or more of said pre-coded software components; and
 inserting one or more of said created composite software components into said launched mobile application creation interface, wherein said inserting said one or more of said pre-coded software components and said one or more of said created software components further comprises dragging and dropping said one or more of said pre-coded software components and said one or more of said created composite software components into said launched mobile application creation interface.

7. The method of claim 1, further comprising generation of one or more recommendations for addition of one or more characteristic objects associated with said new mobile application by said mobile application development software based on a real time analysis and dynamic learning of selective data of similar mobile applications developed based on one or more of functionality, an industry, and a category related to said new mobile application, wherein said generation of one or more recommendations further comprises dynamically updating said generated one or more recommendations for said addition of said one or more characteristic objects associated with said new mobile application, by said mobile application development software, based on a selection of one or more supplementary characteristic objects received from said user device.

8. The method of claim 5, further comprising displaying real time data simulations of said new mobile application in said launched mobile application creation interface by said mobile application development software during each stage of said creation of said new mobile application.

9. The method of claim 5, wherein said pre-coded software components comprise social networking software components configured to embed one or more social features with one or more of business processes and follow up action items in said mobile application development software.

10. The method of claim 5, further comprising dynamically populating data sources in said mobile application creation interface and allowing mapping of one or more of said data sources to one or more of said pre-coded software components by said mobile application development software for one of updating said one or more of said pre-coded software components and creating one or more distinct software components.

11. The method of claim 5, further comprising collecting real time usage data by said mobile application development software for tracking and categorizing users of said created new mobile application and providing real time analytics.

12. The method of claim 5, further comprising operating said mobile application development software as one of software as a service or platform as a service accessible by said user device via said network.

13. The method of claim 5, wherein said pre-coded software components are configurable for generating supplementary software components using said mobile application development software and data sources in said mobile application creation interface.

14. The method of claim 5, further comprising creating, by said mobile application development software, said new mobile application of a plurality of types, wherein said plurality of types comprise a native type of said new mobile application, a web type of said new mobile application, and a cross platform type of said new mobile application for any mobile device or wearable.

15. The method of claim 5, further comprising dynamically mapping said data to be rendered in said new mobile application with one or more of a plurality of data sources, by said mobile application development software.

16. The method of claim 5, further comprising receiving inputs from a user, by said mobile application development software, for said publishing of said created new mobile application to said application store, and for providing access to end users to download said created new mobile application on one or more end user devices or wearables.

17. The method of claim 5, wherein said pre-coded software components comprise dynamically mapped data, and wherein multiple layers of pages of data are dynamically created within said pre-coded software components based on mapping defined by a developer of said new mobile application.

18. An application development system, comprising:
at least one processor;
a non-transitory computer readable storage medium communicatively coupled to said at least one processor, said non-transitory computer readable storage medium configured to store a mobile application development software that, when executed by said at least one processor, causes said at least one processor to:
provide a selection of a plurality of pre-coded software components on a user device, wherein said mobile application development software is accessible from said user device via a network, and wherein said pre-coded software components are fully developed mobile applications executable by said at least one processor;
create a new mobile application by a mobile application creation module of said mobile application development software by launching a mobile application creation interface in said user device, wherein said mobile application creation module is configured to:
insert one or more pre-coded software components into said launched mobile application creation interface, by a component insertion module of said mobile application development software;
assemble said inserted one or more of said pre-coded software components, by a mobile application creation module of said mobile application development software;
adaptively configure, by a backend integration module of said mobile application development software, one or more application programming interfaces for a backend integration of said new mobile application with said user device for operating said new mobile application on said user device;
connect, by said backend integration module, said new mobile application to a plurality of backend databases via said network for creating one or more enhanced applications; and
provide direct access to one or more of web services or said one or more adaptively configured application programming interfaces from a web address; and
provide said new mobile application from said user device to an application store for publishing and distribution, wherein other users can download said new mobile application by accessing said application store directly from their user devices.

19. The application development system of claim 18, wherein said mobile application development software further comprises a mapping module configured to dynamically map said data to be rendered in said mobile application development software with one or more of a plurality of data sources.

20. The application development system of claim 18, wherein said pre-coded software components comprise dynamically mapped data, and wherein multiple layers of pages of data are dynamically created within said pre-coded software components based on mapping defined by a developer of said new mobile application.

21. The application development system of claim 18, wherein said mobile application creation module, when executed by said at least one processor, further causes said at least one processor to:
create one or more composite software components by combining one or more distinct software components selected from a plurality of component sources and/or one or more of said pre-coded software components; and
insert one or more of said created composite software components into said launched mobile application creation interface, wherein said insertion of said one or more of said pre-coded software components and said one or more of said created software components further comprises dragging and dropping said one or more of said pre-coded software components and said one or more of said created composite software components into said launched mobile application creation interface.

22. The application development system of claim 18, wherein said mobile application development software is configured to operate as one of software as a service and platform as a service accessible by said user device via said network.

23. The application development system of claim 18, wherein said mobile application development software is configured to create said new mobile application of a plurality of types, wherein said types comprises a native type of said new mobile application, a web type of said new mobile application, and a cross platform type of said new mobile application for any mobile device or wearable.

24. The application development system of claim 18, wherein said mobile application development software further comprises an analytics engine configured to collect real time usage data for tracking and categorizing users of said created new mobile application and providing real time analytics.

25. The application development system of claim 18, wherein said mobile application creation module is configured to display real time data simulations of said new mobile application in said launched mobile application creation interface during each stage of said creation of said new mobile application.

26. The application development system of claim 18, wherein said mobile application development software further comprises a recommendation engine configured to:
generate one or more recommendations for addition of one or more characteristic objects associated with said new mobile application based on a real time analysis and dynamic learning of selective data of similar mobile applications developed based on one or more of functionality, an industry, and a category related to said new mobile application; and
dynamically update said generated one or more recommendations for said addition of said one or more characteristic objects associated with said new mobile application based on a selection of one or more supplementary characteristic objects received from said user device.

27. The application development system of claim 19, wherein said mapping module is further configured to dynamically populate data sources in said mobile application creation interface and map one or more of said data sources to one or more of said pre-coded software components for one or more of updating said one or more pre-coded software components or creating one or more distinct software components based on inputs received from said user device.

28. The application development system of claim 18, wherein said pre-coded software components are configurable for generating supplementary software components using said mobile application development software and data sources in said mobile application creation interface, and wherein said pre-coded software components comprise social networking software components configured to embed one or more social features comprising one or more of business processes or follow up action items into said new mobile application.

\* \* \* \* \*

UNITED STATES PATENT AND TRADEMARK OFFICE
CERTIFICATE OF CORRECTION

| | | |
|---|---|---|
| PATENT NO. | : 10,133,558 B2 | Page 1 of 8 |
| APPLICATION NO. | : 15/051704 | |
| DATED | : November 20, 2018 | |
| INVENTOR(S) | : Arshad Farooqi | |

It is certified that error appears in the above-identified patent and that said Letters Patent is hereby corrected as shown below:

In the Claims

Column 33, Line 20-Column 40, Line 28 should be corrected to read:

1. A method, comprising:
    receiving a selection of a plurality of pre-coded software components, wherein said pre-coded software components are provided by a mobile application development software accessible from a user device via a network, and wherein said pre-coded software components are fully developed mobile applications executable by at least one processor;
    creating a new mobile application by launching a mobile application creation interface, wherein said creating said new mobile application in said launched mobile application creation interface further comprises:
        inserting one or more of said pre-coded software components into said launched mobile application creation interface;
        assembling said inserted one or more of said pre-coded software components;
        using, by said mobile application development software, one or more adaptively configured application programming interfaces for a backend integration of said new mobile application with said user device for operating said new mobile application on said user device, wherein said one or more adaptively configured application programming interfaces are configured to implement one or more of a backend integration, a machine to machine or internet of things (IOT) data convergence, a process to machine data interaction for enabling one or more of a gamification, an augmented reality, or a near field communication, or a communication and exchange of data between said new mobile application and said user device;
        connecting, by said mobile application development software, to a plurality of backend databases via said network for creating one or more enhanced mobile applications; and
        providing, by said mobile application development software, direct access to one or more of web services or said one or more adaptively configured application programming interfaces from a web address; and Signed and Sealed this
Sixteenth Day of July, 2019

Andrei Iancu
*Director of the United States Patent and Trademark Office* transmitting said new mobile application to an application store for publishing and distribution, wherein other users can download said new mobile application by accessing said application store directly from their user devices.

2. A mobile application development system, comprising:
   at least one processor;
   a non-transitory computer readable storage medium communicatively coupled to said at least one processor, said non-transitory computer readable storage medium configured to store a mobile application development software that, when executed by said at least one processor, causes said at least one processor to:
   provide a selection of a plurality of pre-coded software components on a user device, wherein said mobile application development software is accessible from said user device via a network, and wherein said pre-coded software components are fully developed mobile applications executable by said at least one processor;
   create a new mobile application by a mobile application creation module of said mobile application development software by launching a mobile application creation interface, wherein said mobile application creation module is configured to:
   insert one or more pre-coded software components into said launched mobile application creation interface, by a component insertion module of said mobile application development software;
   assemble said inserted one or more of said pre-coded software components, by a mobile application creation module of said mobile application development software;
   adaptively configure, by a backend integration module of said mobile application development software, one or more application programming interfaces for a backend integration of said new mobile application with said user device for operating said new mobile application on said user device, wherein said one or more adaptively configured application programming interfaces are configured to implement one or more of a backend integration, a machine to machine or internet of things (IOT) data convergence, a process to machine data interaction for enabling one or more of a gamification, an augmented reality, or a near field communication, or a communication and exchange of data between said new mobile application and said user device;
   connect, by said backend integration module, said new mobile application to a plurality of backend databases via said network for creating one or more enhanced mobile applications; and
   provide direct access to one or more of web services or said one or more adaptively configured application programming interfaces from a web address; and
   transmit said new mobile application to an application store for publishing and distribution, wherein other users can download said new mobile application by accessing said application store directly from their user devices.

3. A non-transitory computer readable storage medium communicatively coupled to at least one processor, said non-transitory computer readable storage medium configured to store a mobile application development software that, when executed by said at least one processor, causes a mobile application development system to perform a method comprising:

receiving a selection of a plurality of pre-coded software components, wherein said pre-coded software components are provided by the mobile application development software accessible from a user device via a network, and wherein said pre-coded software components are fully developed mobile applications executable by said at least one processor;

creating a new mobile application by launching a mobile application creation interface in said user device, wherein said creation of said new mobile application comprises:

inserting one or more of said pre-coded software components into said launched mobile application creation interface;

assembling said inserted one or more of said pre-coded software components;

using, by said mobile application development software, one or more adaptively configured application programming interfaces for a backend integration of said new mobile application with said user device for operating said new mobile application on said user device;

connecting, by said mobile application development software, to a plurality of backend databases via said network for creating one or more enhanced applications; and providing, by said mobile application development software, direct access to one or more of web services or said one or more adaptively configured application programming interfaces from a web address; and providing said new mobile application from said user device to an application store for publishing and distribution, wherein other users can download said new mobile application by accessing said application store directly from their user devices.

4. A computer implemented method, comprising:

allowing developers to submit pre-coded software components to an application library accessible by one or more users to build and deploy new mobile applications;

enabling a backend integration of said new mobile applications with devices belonging to said users, wherein enabling said backend integration comprises:

providing one or more adaptively configured application programming interfaces for operating said new mobile applications on said devices belonging to said users, wherein said one or more adaptively configured application programming interfaces are configured to implement one or more of a backend integration, a machine to machine or internet of things (IOT) data convergence, a process to machine data interaction for enabling one or more of a gamification, an augmented reality, or a near field communication, or a communication and exchange of data between said new mobile applications and user device;

connecting said new mobile applications to a plurality of backend databases via a network for creating one or more enhanced mobile applications; and providing direct access to one or more of web services or said one or more adaptively configured application programming interfaces from a web address;

providing an application delivery model to said users that supports hyper-personalization to assemble said new mobile applications on the fly rather than downloading and using a pre-built mobile application from an application store; and enabling said users to hyper-personalize said pre-built mobile application by one or more of modifying said pre-built mobile application or building said new mobile applications as per their own preferences without coding.

5. A method, comprising:
    receiving a selection of a plurality of pre-coded software components, wherein said pre-coded software components are provided by a mobile application development software accessible from a user device via a network, and wherein said pre-coded software components are fully developed mobile applications executable by at least one processor;
    creating a new mobile application by launching a mobile application creation interface in said user device, wherein said creation of said new mobile application comprises:
        inserting one or more of said pre-coded software components into said launched mobile application creation interface;
        assembling said inserted one or more of said pre-coded software components;
        using, by said mobile application development software, one or more adaptively configured application programming interfaces for a backend integration of said new mobile application with said user device for operating said new mobile application on said user device;
        connecting, by said mobile application development software, to a plurality of backend databases via said network for creating one or more enhanced applications; and
        providing, by said mobile application development software, direct access to one or more of web services or said one or more adaptively configured application programming interfaces from a web address; and
    providing said new mobile application from said user device to an application store for publishing and distribution, wherein other users can download said new mobile application by accessing said application store directly from their user devices.

6. The method of claim 5, further comprising:
    creating one or more composite software components by combining one or more distinct software components selected from a plurality of component sources and/or one or more of said pre-coded software components; and
    inserting one or more of said created composite software components into said launched mobile application creation interface, wherein said inserting said one or more of said pre-coded software components and said one or more of said created software components further comprises dragging and dropping said one or more of said pre-coded software components and said one or more of said created composite software components into said launched mobile application creation interface.

7. The method of claim 5, further comprising generation of one or more recommendations for addition of one or more characteristic objects associated with said new mobile application by said mobile application development software based on a real time analysis and dynamic learning of selective data of similar mobile applications developed based on one or more of functionality, an industry, and a category related to said new mobile application, wherein said generation of one or more recommendations further comprises dynamically updating said generated one or more recommendations for said addition of said one or more characteristic objects associated with said new mobile application, by said mobile application development software, based on a selection of one or more supplementary characteristic objects received from said user device.

8. The method of claim 5, further comprising displaying real time data simulations of said new mobile application in said launched mobile application creation interface by said mobile application development software during each stage of said creation of said new mobile application.

9. The method of claim 5, wherein said pre-coded software components comprise social networking software components configured to embed one or more social features with one or more of business processes and follow up action items in said mobile application development software.

10. The method of claim 5, further comprising dynamically populating data sources in said mobile application creation interface and allowing mapping of one or more of said data sources to one or more of said pre-coded software components by said mobile application development software for one of updating said one or more of said pre-coded software components and creating one or more distinct software components.

11. The method of claim 5, further comprising collecting real time usage data by said mobile application development software for tracking and categorizing users of said created new mobile application and providing real time analytics.

12. The method of claim 5, further comprising operating said mobile application development software as one of software as a service or platform as a service accessible by said user device via said network.

13. The method of claim 5, wherein said pre-coded software components are configurable for generating supplementary software components using said mobile application development software and data sources in said mobile application creation interface.

14. The method of claim 5, further comprising creating, by said mobile application development software, said new mobile application of a plurality of types, wherein said plurality of types comprise a native type of said new mobile application, a web type of said new mobile application, and a cross platform type of said new mobile application for any mobile device or wearable.

15. The method of claim 5, further comprising dynamically mapping said data to be rendered in said new mobile application with one or more of a plurality of data sources, by said mobile application development software.

16. The method of claim 5, further comprising receiving inputs from a user, by said mobile application development software, for said publishing of said created new mobile application to said application store, and for providing access to end users to download said created new mobile application on one or more end user devices or wearables.

17. The method of claim 5, wherein said pre-coded software components comprise dynamically mapped data, and wherein multiple layers of pages of data are dynamically created within said pre-coded software components based on mapping defined by a developer of said new mobile application.

18. An application development system, comprising:
    at least one processor; a non-transitory computer readable storage medium communicatively coupled to said at least one processor, said non-transitory computer readable storage medium configured to store a mobile application development software that, when executed by said at least one processor, causes said at least one processor to:
        provide a selection of a plurality of pre-coded software components on a user device, wherein said mobile application development software is accessible from said user device via a network, and wherein said pre-coded software components are fully developed mobile applications executable by said at least one processor;
        create a new mobile application by a mobile application creation module of said mobile application development software by launching a mobile application creation interface in said user device, wherein said mobile application creation module is configured to:
            insert one or more pre-coded software components into said launched mobile application creation interface, by a component insertion module of said mobile application development software;
            assemble said inserted one or more of said pre-coded software components, by a mobile application creation module of said mobile application development software;
            adaptively configure, by a backend integration module of said mobile application development software, one or more application programming interfaces for a backend integration of said new mobile application with said user device for operating said new mobile application on said user device;
            connect, by said backend integration module, said new mobile application to a plurality of backend databases via said network for creating one or more enhanced applications; and
            provide direct access to one or more of web services or said one or more adaptively configured application programming interfaces from a web address; and
        provide said new mobile application from said user device to an application store for publishing and distribution, wherein other users can download said new mobile application by accessing said application store directly from their user devices.

19. The application development system of claim 18, wherein said mobile application development software further comprises a mapping module configured to dynamically map said data to be rendered in said mobile application development software with one or more of a plurality of data sources.

20. The application development system of claim 19, wherein said mapping module is further configured to dynamically populate data sources in said mobile application creation interface and map one or more of said data sources to one or more of said pre-coded software components for one or more of updating said one or more pre-coded software components or creating one or more distinct software components based on inputs received from said user device.

21. The application development system of claim 18, wherein said pre-coded software components comprise dynamically mapped data, and wherein multiple layers of pages of data are dynamically created within said pre-coded software components based on mapping defined by a developer of said new mobile application.

22. The application development system of claim 18, wherein said mobile application creation module, when executed by said at least one processor, further causes said at least one processor to:
    create one or more composite software components by combining one or more distinct software components selected from a plurality of component sources and/or one or more of said pre-coded software components; and
    insert one or more of said created composite software components into said launched mobile application creation interface, wherein said insertion of said one or more of said pre-coded software components and said one or more of said created software components further comprises dragging and dropping said one or more of said pre-coded software components and said one or more of said created composite software components into said launched mobile application creation interface.

23. The application development system of claim 18, wherein said mobile application development software is configured to operate as one of software as a service and platform as a service accessible by said user device via said network.

24. The application development system of claim 18, wherein said mobile application development software is configured to create said new mobile application of a plurality of types, wherein said types comprises a native type of said new mobile application, a web type of said new mobile application, and a cross platform type of said new mobile application for any mobile device or wearable.

25. The application development system of claim 18, wherein said mobile application development software further comprises an analytics engine configured to collect real time usage data for tracking and categorizing users of said created new mobile application and providing real time analytics.

26. The application development system of claim 18, wherein said mobile application creation module is configured to display real time data simulations of said new mobile application in said launched mobile application creation interface during each stage of said creation of said new mobile application.

27. The application development system of claim 18, wherein said mobile application development software further comprises a recommendation engine configured to:
    generate one or more recommendations for addition of one or more characteristic objects associated with said new mobile application based on a real time analysis and dynamic learning of selective data of similar mobile applications developed based on one or more of functionality, an industry, and a category related to said new mobile application; and
    dynamically update said generated one or more recommendations for said addition of said one or more characteristic objects associated with said new mobile application based on a selection of one or more supplementary characteristic objects received from said user device.

28. The application development system of claim 18, wherein said pre-coded software components are configurable for generating supplementary software components using said mobile application development software and data sources in said mobile application creation interface, and wherein said pre-coded software components comprise social networking software components configured to embed one or more social features comprising one or more of business processes or follow up action items into said new mobile application.